United States Patent
Shimizu et al.

(10) Patent No.: US 11,653,081 B2
(45) Date of Patent: May 16, 2023

(54) IMAGING APPARATUS, IMAGING METHOD AND IMAGING PROGRAM

(71) Applicant: MAXELL, LTD., Kyoto (JP)

(72) Inventors: Hiroshi Shimizu, Kyoto (JP); Akira Ishiyama, Kyoto (JP); Kazuhiko Yoshizawa, Kyoto (JP); Yasunobu Hashimoto, Kyoto (JP); Motoyuki Suzuki, Kyoto (JP); Mitsunobu Watanabe, Kyoto (JP)

(73) Assignee: MAXELL, LTD., Kyoto (JP)

( * ) Notice: Subject to any disclaimer, the term of this patent is extended or adjusted under 35 U.S.C. 154(b) by 0 days.

(21) Appl. No.: 17/688,397

(22) Filed: Mar. 7, 2022

(65) Prior Publication Data

US 2022/0191371 A1    Jun. 16, 2022

Related U.S. Application Data

(63) Continuation of application No. 16/928,592, filed on Jul. 14, 2020, now Pat. No. 11,303,794, which is a
(Continued)

(51) Int. Cl.
*H04N 5/235*    (2006.01)
*H04N 5/232*    (2006.01)
*G06T 5/00*    (2006.01)

(52) U.S. Cl.
CPC ............. *H04N 5/232* (2013.01); *G06T 5/009* (2013.01); *H04N 5/2327* (2013.01);
(Continued)

(58) Field of Classification Search
CPC .... H04N 5/232; H04N 5/2327; H04N 5/2353; H04N 5/2355; H04N 5/23245;
(Continued)

(56) References Cited

U.S. PATENT DOCUMENTS 8,493,454 B1    7/2013    Kohn et al.
9,883,119 B1    1/2018    Atanassov et al.
(Continued)

FOREIGN PATENT DOCUMENTS

JP    2002-290822 A    10/2002
JP    2007-336561 A    12/2007
(Continued)

OTHER PUBLICATIONS

International Search Report for PCT/JP2016/069710, dated Sep. 27, 2016.
(Continued)

*Primary Examiner* — Sinh Tran
*Assistant Examiner* — Zhenzhen Wu
(74) *Attorney, Agent, or Firm* — Volpe Koenig

(57) ABSTRACT

An imaging method is provided that includes: taking an image of an object to generate an image signal of the object; generating a taken image of the object on a basis of the image signal; detecting motion information of the object on the basis of the image signal; taking an image of the object on a basis of the motion information multiple times so as to differentiate an exposure amount thereof and generating an HDR synthetic image of the object on the basis of a plurality of image signals whose exposure amounts are different from each other.

20 Claims, 18 Drawing Sheets

Related U.S. Application Data continuation of application No. 16/314,478, filed as application No. PCT/JP2016/069710 on Jul. 1, 2016, now Pat. No. 10,757,344.

(52) U.S. Cl.
CPC ......... *H04N 5/2353* (2013.01); *H04N 5/2355* (2013.01); *G06T 2207/20208* (2013.01)

(58) Field of Classification Search
CPC ............. H04N 5/23254; H04N 5/2258; H04N 5/2323; H04N 5/2351; G06T 5/009; G06T 2207/20208; G06T 2207/10144; G06T 5/50
See application file for complete search history.

(56) References Cited

U.S. PATENT DOCUMENTS

| | | |
|---|---|---|
| 10,757,344 B2 | 8/2020 | Shimizu et al. |
| 2007/0292048 A1 | 12/2007 | Choe et al. |
| 2008/0149812 A1 | 6/2008 | Ward et al. |
| 2009/0180704 A1 | 7/2009 | Wey |
| 2010/0259626 A1 | 10/2010 | Savidge |
| 2012/0201427 A1 | 8/2012 | Jasinkski et al. |
| 2013/0135464 A1* | 5/2013 | Kuroki ..................... G06T 7/20 348/135 |
| 2014/0071245 A1 | 3/2014 | Zhang et al. |
| 2014/0071330 A1* | 3/2014 | Zhang ................ H04N 5/23222 348/335 |
| 2014/0152773 A1 | 6/2014 | Ohba et al. |
| 2014/0232929 A1 | 8/2014 | Ichikawa |
| 2015/0054985 A1 | 2/2015 | Baek et al. |
| 2015/0312463 A1 | 10/2015 | Gupta et al. |
| 2017/0352136 A1 | 12/2017 | Uliyar et al. |
| 2019/0014249 A1 | 1/2019 | Zhu |

FOREIGN PATENT DOCUMENTS

| | | |
|---|---|---|
| JP | 2010-072092 A | 4/2010 |
| JP | 2010-512719 A | 4/2010 |
| JP | 2010-219940 A | 9/2010 |
| JP | 2013-026978 A | 2/2013 |

OTHER PUBLICATIONS

Japanese Office Action dated Mar. 3, 2020 for Japanese Patent Application No. 2018-524710.
Japanese Office Action dated Sep. 14, 2021 the Japanese Patent Application No. 2020-184969.

\* cited by examiner

FIG. 8
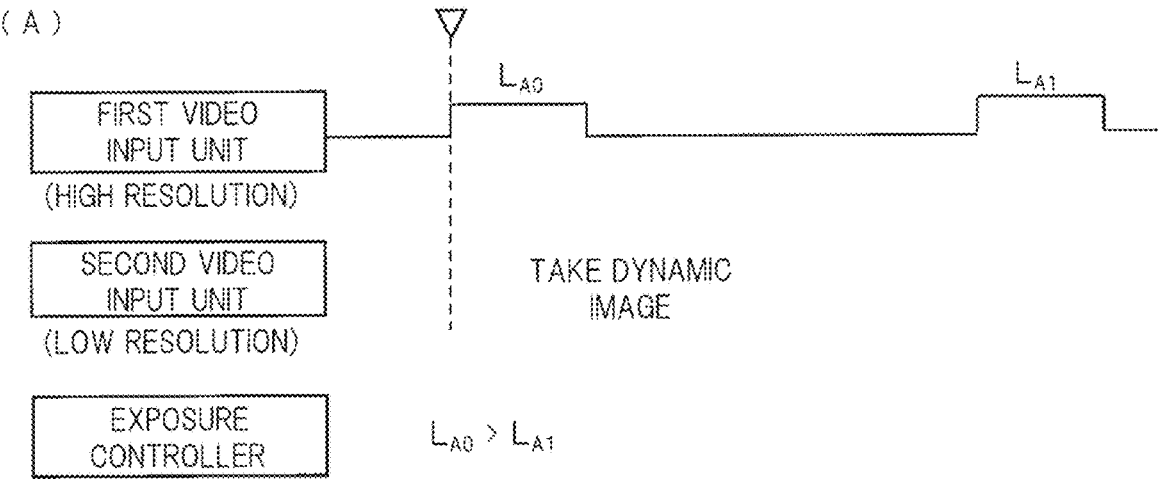
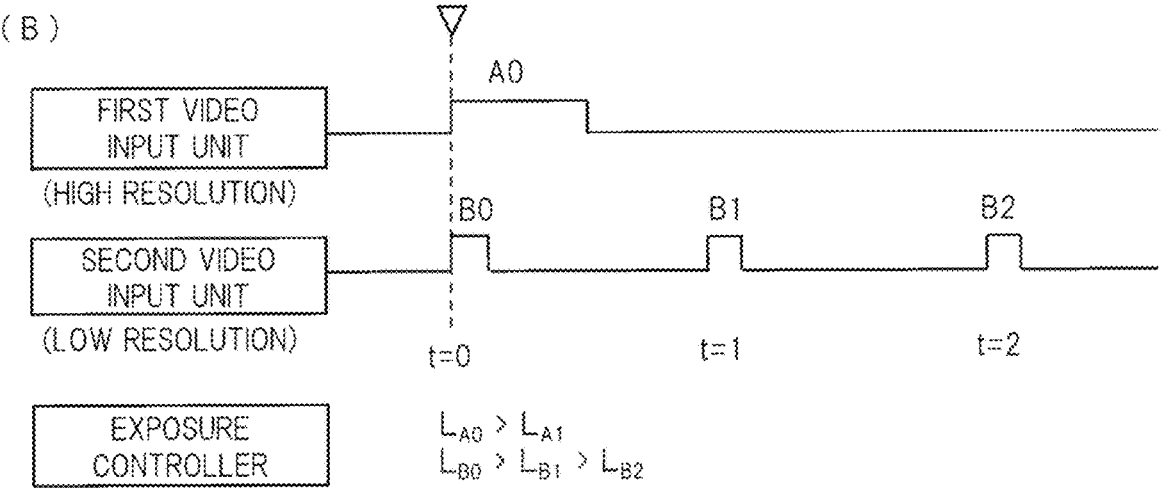
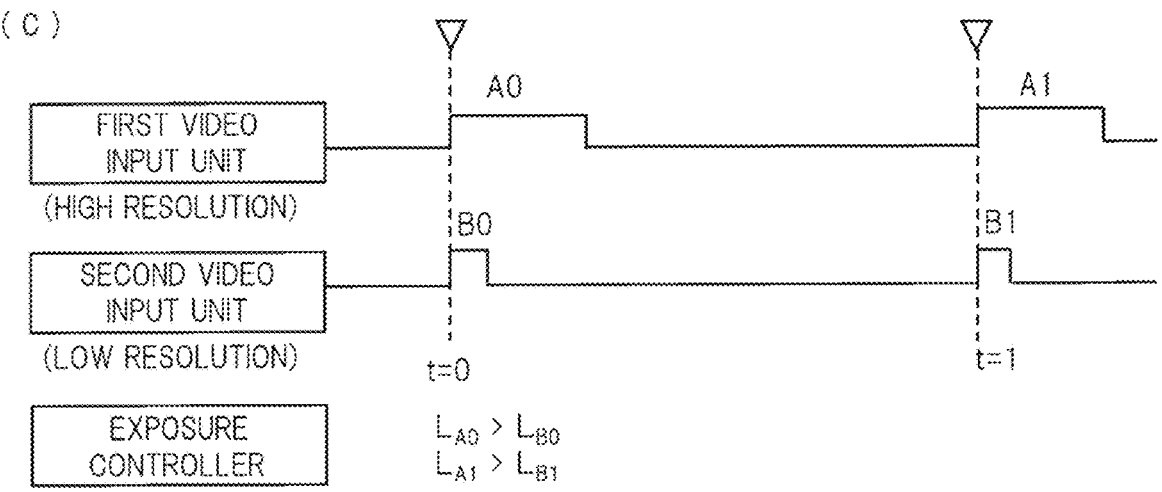

FIG. 10
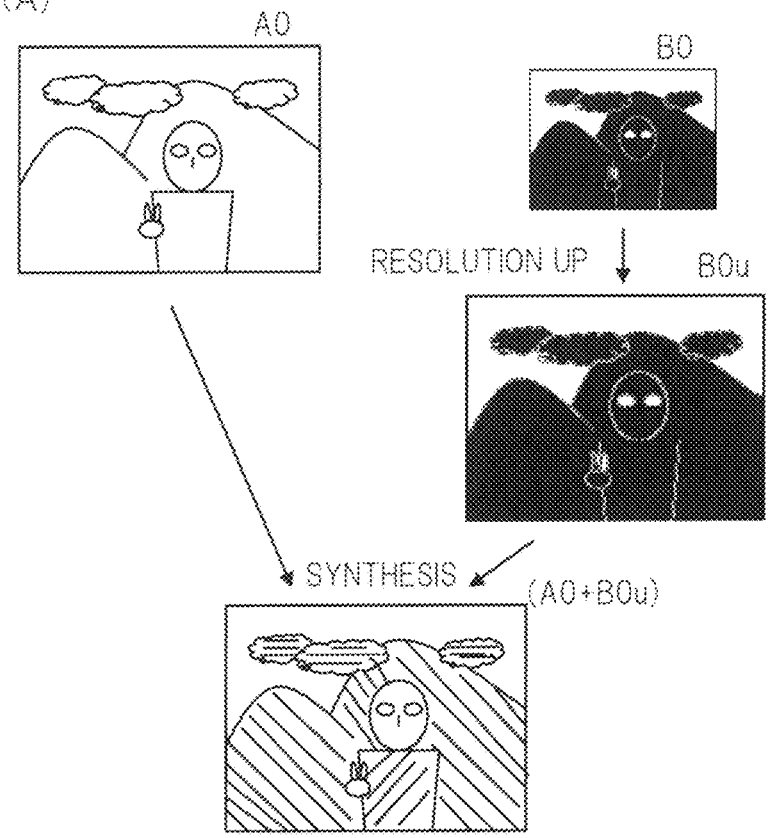
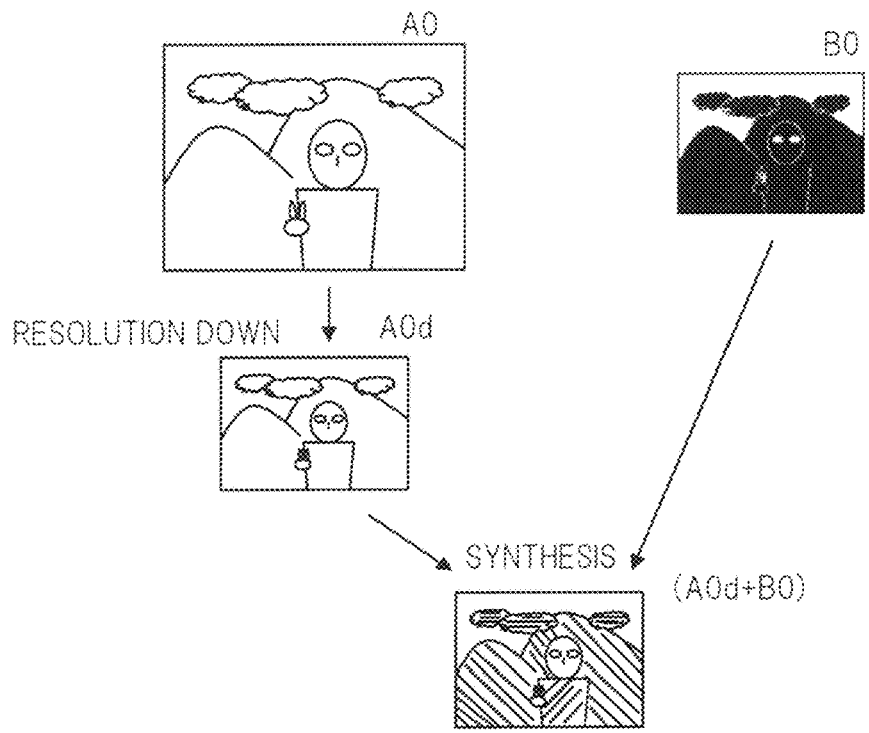

FIG. 11
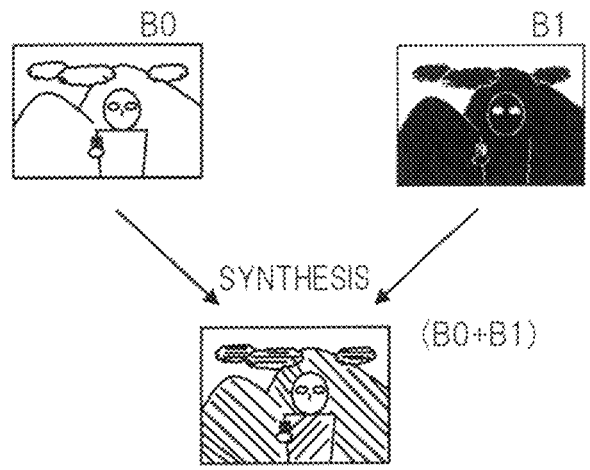
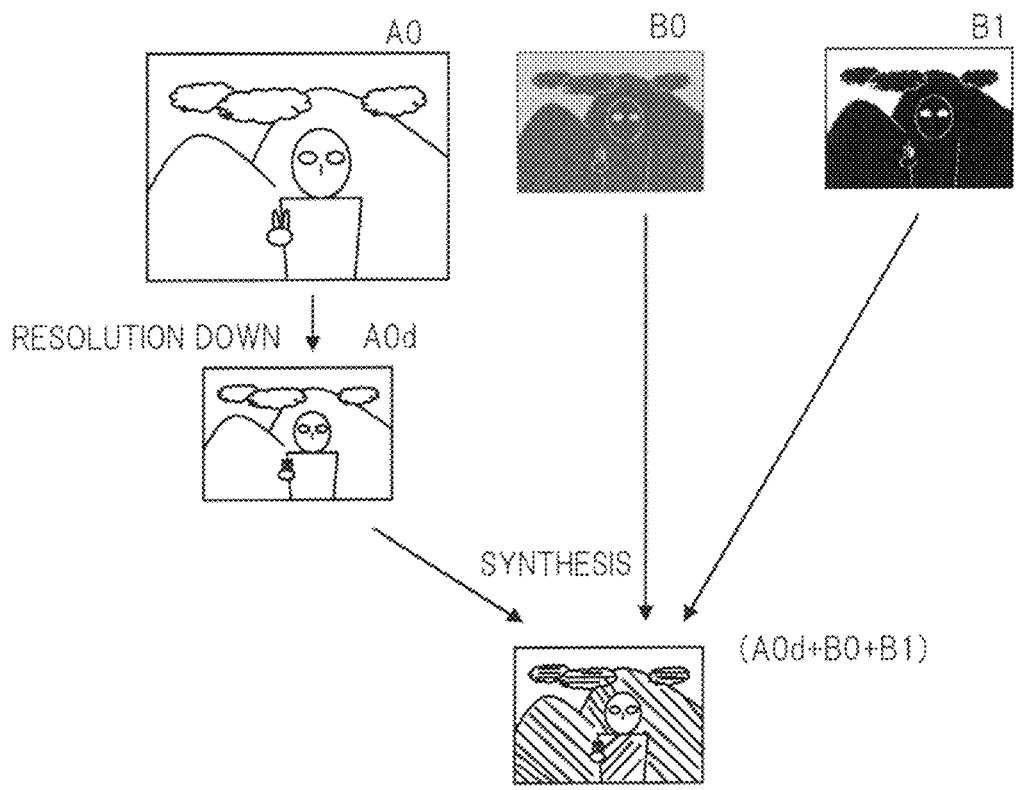

FIG. 17
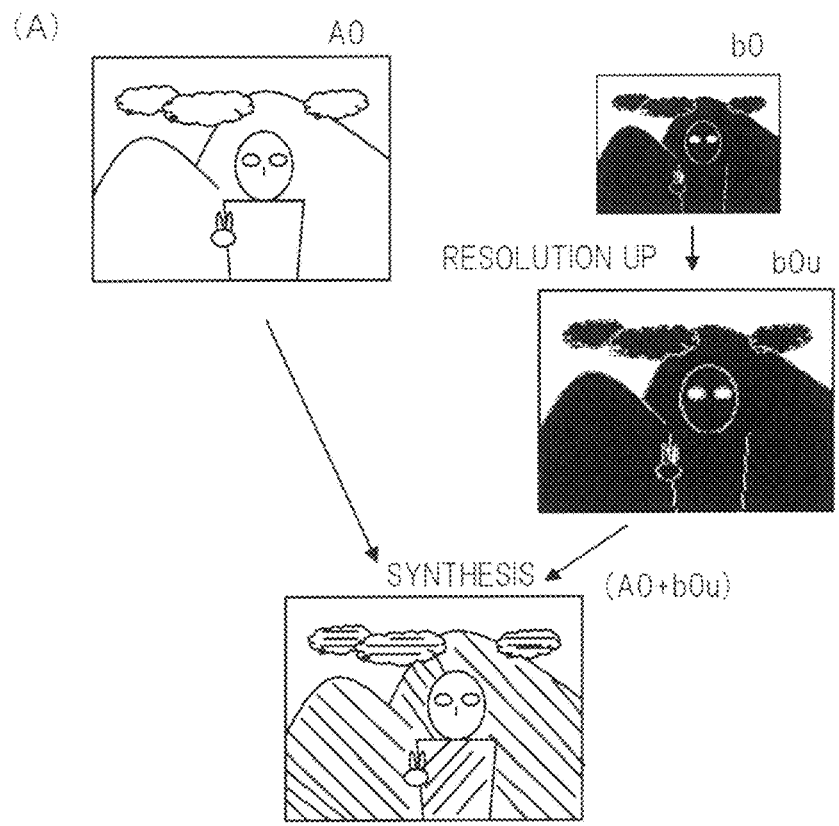
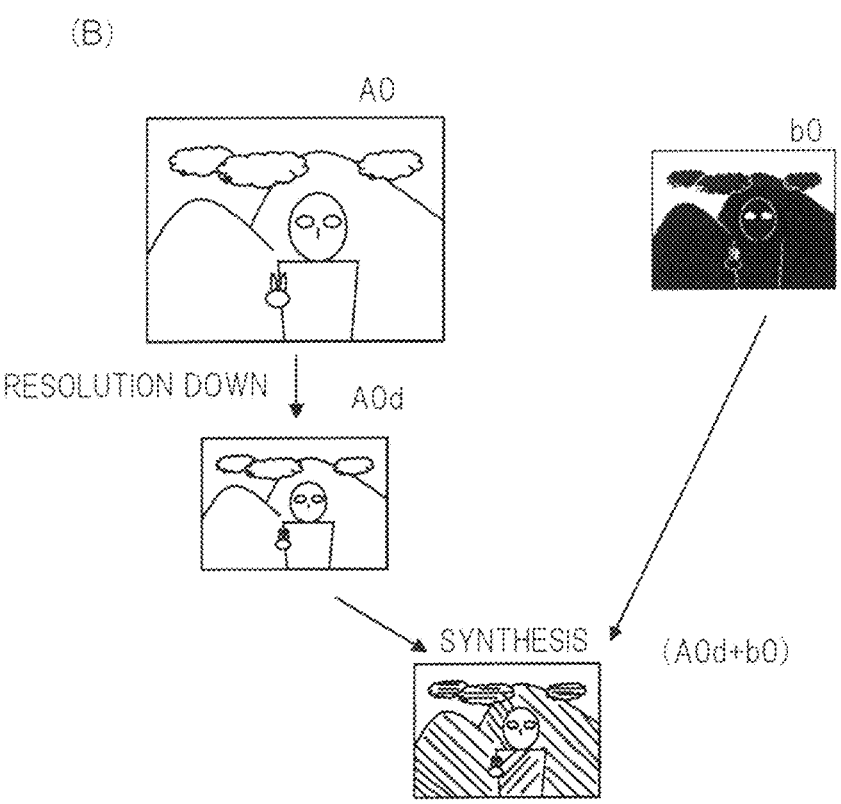

ated Page: Summary: Summary: Summary: Summary: Summary: Summary: Summary: Summary: Summary: Summary:

IMAGING APPARATUS, IMAGING METHOD AND IMAGING PROGRAM

CROSS REFERENCE TO RELATED APPLICATION

This application claims the benefit and is a continuation of U.S. patent application Ser. No. 16/928,592, filed on Jul. 14, 2020, which is a continuation of U.S. patent application Ser. No. 16/314,478 filed on Dec. 31, 2018 which claims the benefit of PCT/JP2016/069710 filed on Jul. 1, 2016, which is incorporated by reference as if fully set forth.

TECHNICAL FIELD

The present invention relates to an imaging apparatus, an imaging control method, and an imaging program, and particularly, the present invention relates to an imaging apparatus, an imaging control method and an imaging program configured to synthesize images obtained by taking an image while changing exposure amounts of a plurality of cameras and to generate an HDR (High Dynamic Range) synthetic image.

BACKGROUND ART

The spread of a digital camera is remarkable. The digital camera converts an object image into an electric signal by an electronic device such as a CCD (Charge Coupled Device), for example, and stores the converted electric signal in a memory. Further, recently, an information terminal device on which a digital camera is mounted, such as a cellular phone, a smartphone, or a tablet terminal is also spreaded widely.

A dynamic range of an imaging device used in a digital camera or the like is very narrow compared with a film. Therefore, so-called underexposure (or black spot) or overexposure (or white spot) occurs depending upon an imaging condition, whereby image quality is extremely deteriorated. In order to solve such a defect, an HDR synthesize function gains attention. In the HDR synthesize function, a plurality of images is taken while changing exposure, dark portions are extracted from an image obtained by lengthening exposure and bright portions are extracted from an image obtained by shortening exposure when these images are to be synthesized, whereby a broad dynamic range can be acquired while suppressing overexposure and underexposure.

For example, Patent document 1 discloses a video generating apparatus that has two imaging devices in which one with high resolution takes an image with a small exposure amount and the other with low resolution takes an image with a large exposure amount for a short exposure time, whereby an HDR synthetic image is created while reducing noise due to camera shake or the like.

RELATED ART DOCUMENTS

Patent Documents

Patent document 1: Japanese Patent Application Publication No. 2007-336561

SUMMARY OF THE INVENTION

Problems to be Solved by the Invention

However, a technique disclosed in Patent document 1 aims at reduction of noise such as camera shake by shortening the exposure time when an image with a large exposure amount is to be taken. However, Patent document 1 does not consider an HDR synthesizing method to acquire more suitable image quality based on imaging environment such as motion of an object, brightness, or camera shake. Further, an effective utilization method of the two imaging devices is also not mentioned therein.

It is thus an object of the present invention to provide an imaging apparatus, an imaging control method and a program configured to generate a high-quality HDR synthetic image compatible with imaging environment.

Means for Solving the Problem

An outline of representative invention of the present invention disclosed in the present application will briefly be explained as follows.

An imaging apparatus according to a representative embodiment of the present invention includes: a video input unit configured to take an image of an object to generate an image signal of the object; a video signal processor configured to generate a taken image of the object on a basis of the image signal; and a controller configured to: detect motion information of the object on the basis of the image signal; cause the video input unit to take an image of the object on a basis of the motion information multiple times so as to differentiate an exposure amount thereof, and cause the video signal processor to generate an HDR synthetic image of the object on the basis of a plurality of image signals whose exposure amounts are different from each other.

Effects of the Invention

Effects obtained by representative invention of the present invention disclosed in the present application will briefly be explained as follows.

Namely, according to a representative embodiment of the present invention, it becomes possible to provide an imaging apparatus, an imaging control method and a program to generate a high-quality HDR synthetic image compatible with imaging environment.

BRIEF DESCRIPTIONS OF THE DRAWINGS

FIG. 8 is a view illustrating a timing chart of the imaging according to the first embodiment of the present invention;

FIG. 10 is a view schematically illustrating the HDR synthesizing process according to the first embodiment of the present invention;

FIG. 11 is a view schematically illustrating the HDR synthesizing process according to the first embodiment of the present invention;

FIG. 17 is a view schematically illustrating the HDR synthesizing process according to the second embodiment of the present invention.

DETAILED DESCRIPTION OF PREFERRED EMBODIMENTS

Hereinafter, examples of embodiments according to the present invention will be described with reference to the drawings. Note that the embodiments that will be explained below are one example for realizing the present invention, are modified or changed appropriately in accordance with a configuration of an apparatus to which the present invention is applied and/or various conditions, and the present invention is not limited to the embodiments described below. Further, a part of each of the embodiments (will be described later) may be combined and configured appropriately.

First Embodiment

Figure 1:
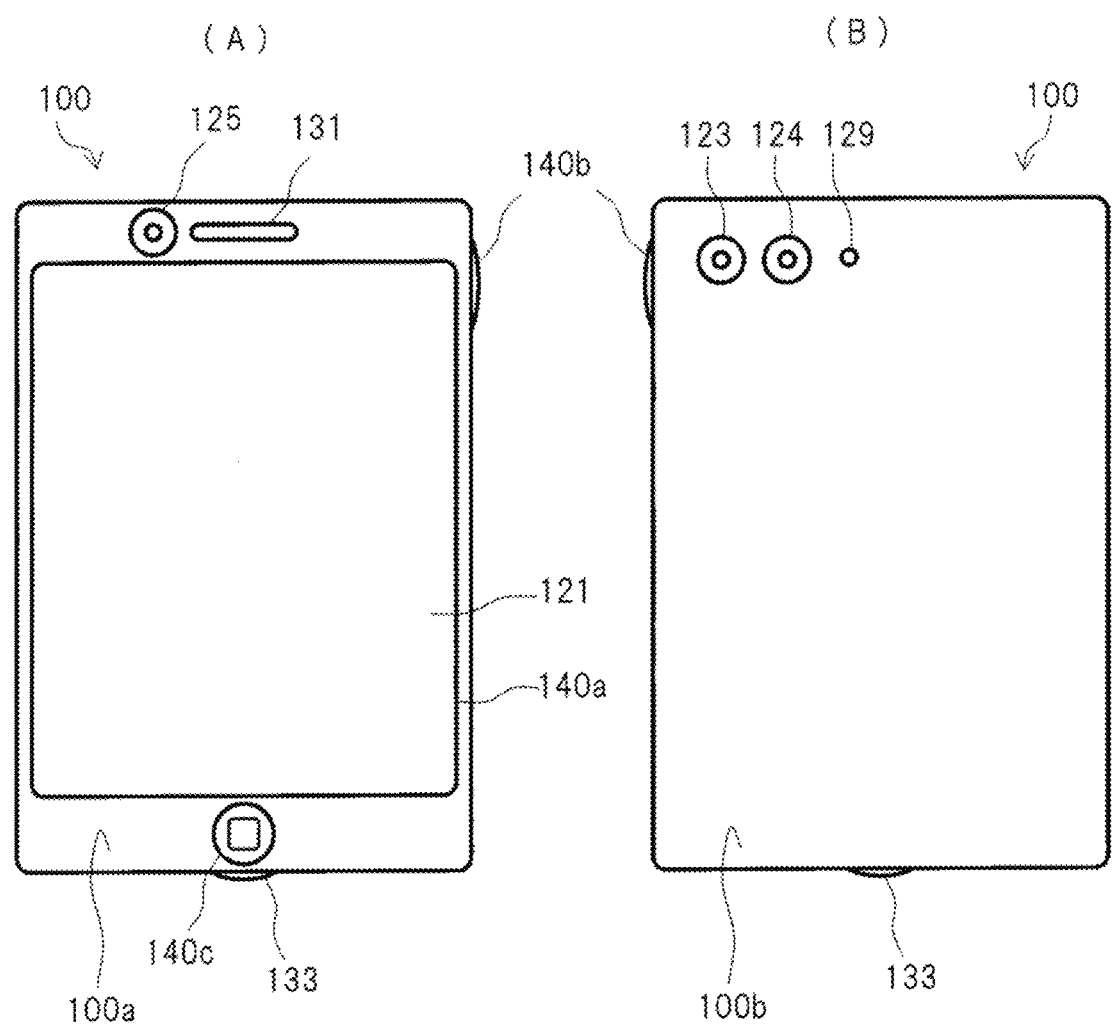
FIG. 1 is an external view illustrating one example of an imaging apparatus 100 according to a first embodiment of the present invention.
Figure 2:
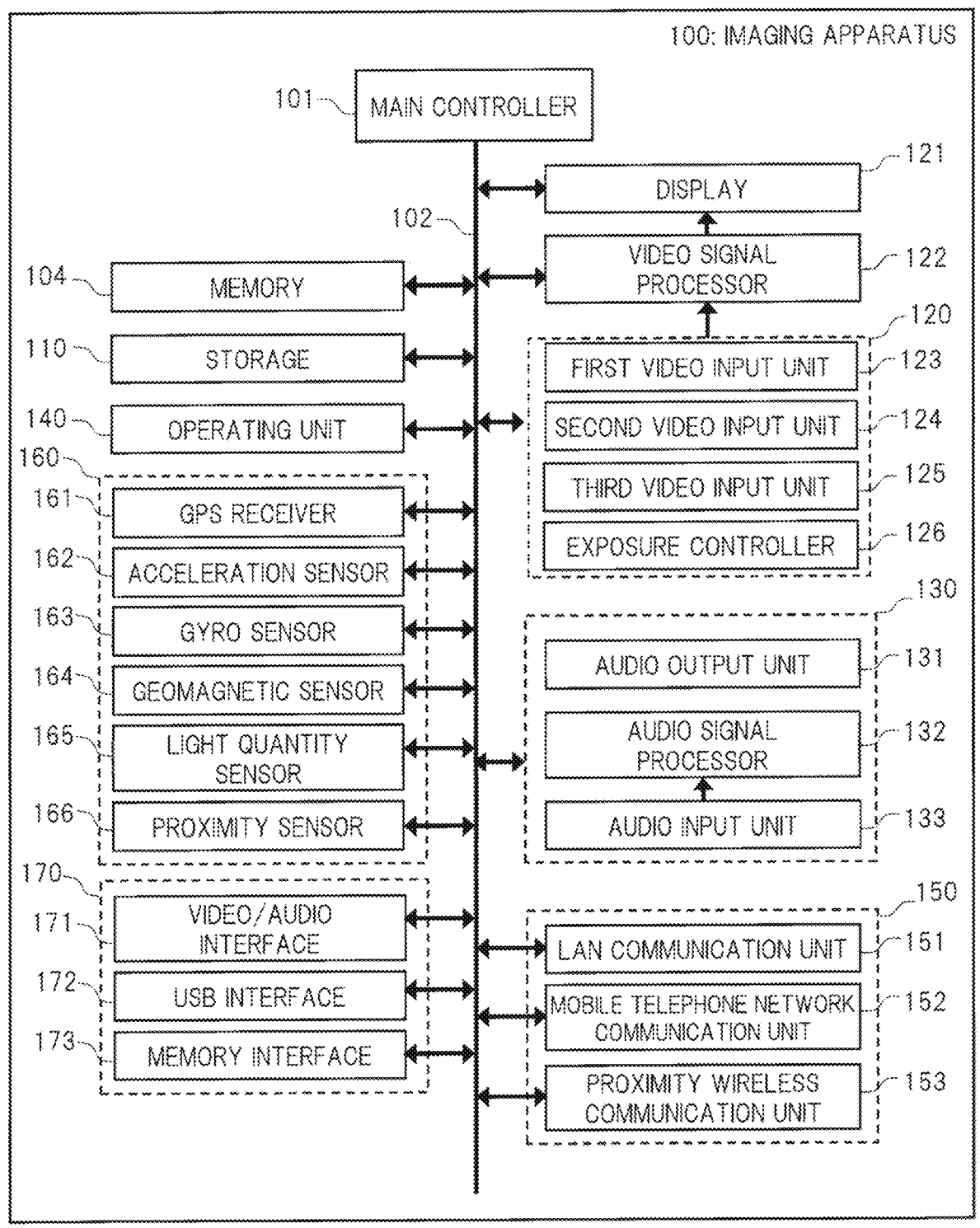
FIG. 2 is a block diagram illustrating one example of a configuration of the imaging apparatus according to the first embodiment of the present invention.
Figure 3:
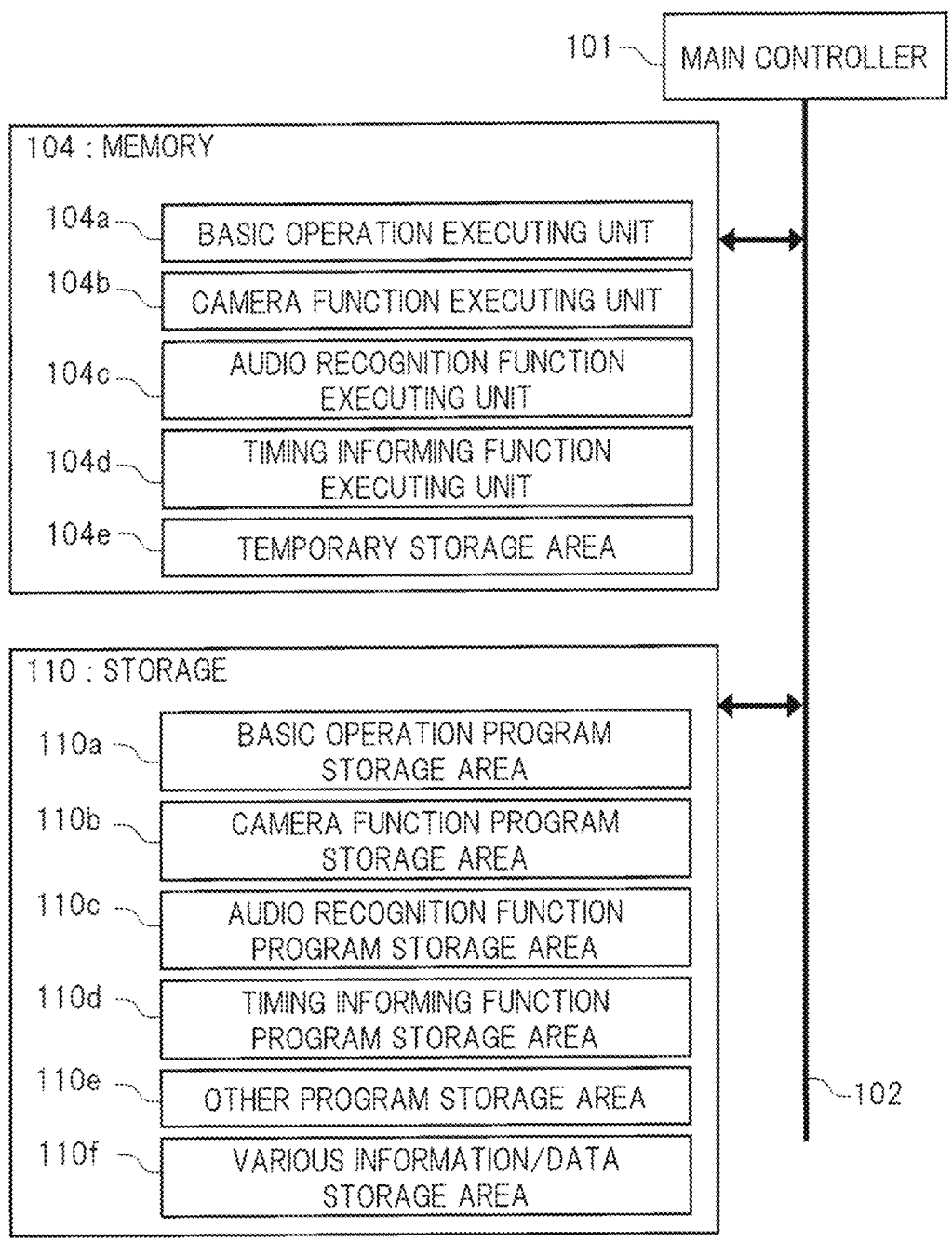
FIG. 3 is a block diagram illustrating one example of a configuration of the imaging apparatus according to the first embodiment of the present invention.

FIG. 1 is a view illustrating one example of appearance of an imaging apparatus according to the first embodiment of the present invention. FIG. 1(A) is a plan view of an imaging apparatus 100, and FIG. 1(B) is a rear view of the imaging apparatus 100. FIG. 2 is a block diagram illustrating one example of a configuration of the imaging apparatus 100 according to the first embodiment of the present invention. FIG. 3 is a block diagram illustrating one example of a software configuration of the imaging apparatus 100 according to the first embodiment of the present invention.

FIG. 1 illustrates the imaging apparatus mounted on a smartphone. However, in addition to this, the imaging apparatus 100 may be mounted on a cellular phone, PDA (Personal Digital Assistants) such as a tablet terminal, or an information processing apparatus such as a notebook PC (Personal Computer), for example. Further, the imaging apparatus 100 may be composed of a digital still camera.

As illustrated in FIG. 1 and FIG. 2, the imaging apparatus 100 includes a main controller (controller) 101, a system bus 102, a memory 104, the storage 110, a video input unit 120, an audio processor 130, an operating unit 140, a communication processor 150, a sensor unit 160, an extension interface unit 170, a display 121, and the like.

The system bus 102 is a data communication path through which respective components of the imaging apparatus 100 are connected to each other. An output and an input of data are executed via system bus 102 between the main controller 101 and each of the components in the imaging apparatus 100.

The storage 110 is composed of a nonvolatile memory such as a flash ROM (Read Only Memory), an SSD (Solid State Drive), an HDD (Hard Disc Drive), for example. Information is stored in the storage 110 even in a state where electric power is not supplied to the imaging apparatus 100.

As illustrated in FIG. 3, the storage 110 includes a basic operation program storage area 110*a*, a camera function program storage area 110*b*, an audio recognition function program storage area 110*c*, a timing informing function program storage area 110*d*, an other program storage area 110*e*, a various information/data storage area 110*f* and the like, for example. Basic operation programs by which a basic operation of the imaging apparatus 100 is executed is stored in the basic operation program storage area 110*a*. A camera function program that realizes a camera function is stored in the camera function program storage area 110*b*. An audio recognition program that realizes an audio recognition function is stored in the audio recognition function program storage area 110*c*. A timing informing program that realizes a timing informing function is stored in the timing informing function program storage area 110*d*. Other programs and the like are stored in the other program storage area 110*e*. Various kinds of information such as operation setting values of the imaging apparatus 100 or user information are stored in the various information/data storage area 110*f*.

Further, the storage 110 stores a taken image that is taken by the imaging apparatus 100, a dynamic image (or a moving image), an HDR synthetic image (will be described later), or these thumbnail images, for example, in the various information/data storage area 110*f*. Further, the storage 110 stores a new application program downloaded from an application server on the Internet in the other program storage area 110*e*, for example.

Further, the storage 110 stores therein a first motion threshold value and a second motion threshold value larger than the first motion threshold value. The first and second motion threshold values become a standard when motion of an object (will be described later) is determined. These motion threshold value are set appropriately by experiments and the like, for example.

Various kinds of programs stored in each unit of the storage 110 are developed on the memory 104. When the various kinds of programs are executed by the main controller 101, various kinds of executing units that realize functions of the respective programs are established on the memory 104. For example, when the basic operation program stored in the basic operation program storage area 110*a* is developed on the memory 104, a basic operation executing unit 104*a* that realizes a basic operation of the imaging apparatus 100 is established on the memory 104. Further, when the camera function program stored in the camera function program storage area 110*b* is developed on the memory 104, a camera function executing unit 104*b* that realizes the camera function is established on the memory 104. Further, when an audio recognition function program stored in the audio recognition function program storage area 110c is developed on the memory 104, an audio recognition function executing unit 104c that realizes the audio recognition function is established on the memory 104. Further, when a timing informing function program stored in the timing informing function program storage area 110d is developed on the memory 104, a timing informing function executing unit 104d that realizes the timing informing function is established on the memory 104. Further, the memory 104 has a temporary storage area 104e in which data is temporarily stored if needed and the like.

Note that each of the components such as the basic operation executing unit 104a, the camera function executing unit 104b, the audio recognition function executing unit 104c, or the timing informing function executing unit 104d may be composed of hardware having the similar function to that of the corresponding element. Further, the memory 104 may be formed integrally with the main controller 101.

As illustrated in FIG. 1(A), the display 121 is provided on a front surface 100a of the imaging apparatus 100 on which a third video input unit 125 is provided. The display 121 is a display device such as a liquid crystal panel or an organic EL (Electro Luminescence) panel, for example. The display 121 displays an HDR synthetic image (will be described later) processed by a video signal processor 122, a taken image before synthesis, a dynamic image, a thumbnail image and the like.

The audio processor 130 is composed of an audio output unit 131, an audio signal processor 132, and an audio input unit 133. The audio output unit 131 is a speaker, for example. As illustrated in FIG. 1(A), the audio output unit 131 is provided at a peripheral part of the display 121 on the front surface 100a of the imaging apparatus 100. The audio output unit 131 emits audio on the basis of an audio signal processed by the audio signal processor 132. The audio input unit 133 is a microphone, for example. As illustrated in FIGS. 1(A) and 1(B), the audio input unit 133 is provided on a side surface of the imaging apparatus 100 and on the opposite side of the audio output unit 131 with respect to the display 121. The audio input unit 133 receives an input of audio from a user or the like of the imaging apparatus 100 to convert the inputted audio into an audio signal. The audio input unit 133 outputs the inputted audio signal to the audio signal processor 132. Note that the audio input unit 133 may be formed separately from the imaging apparatus 100. In this case, the audio input unit 133 and the imaging apparatus 100 may be connected to each other by wired communication or wireless communication.

The operating unit 140 is an instruction input unit that executes an input of an operational instruction to the imaging apparatus 100. In the present embodiment, for example, as illustrated in FIGS. 1(A) and 1(B), the operating unit 140 is composed of a touch panel 140a, an operation key 140b, and an operation key 140c, which are arranged so as to be overlapped on the display 121. The operation key 140b is provided at a side surface of the imaging apparatus 100. The operation key 140c is provided near the display 121 on the front surface 100a of the imaging apparatus 100. However, the operating unit 140 is not required to include all of these components, and may be provided with any of these components. Further, the touch panel 140a may be formed integrally with the display 121. Further, the operating unit 140 may be composed of a keyboard or the like (not illustrated in the drawings), which is connected to the extension interface unit 170 (will be described later). Further, the operating unit 140 may be composed of a separate information terminal apparatus that is connected thereto via wired communication or wireless communication.

The communication processor 150 is composed of a LAN (Local Area Network) communication unit 151, a mobile telephone network communication unit 152, and a proximity wireless communication unit 153, for example. The LAN communication unit 151 executes transmission and reception of data by wireless communication that is connected via an access point for wireless communication of the Internet, for example. The mobile telephone network communication unit 152 is connected to a base station of a mobile phone communication network, and executes telephone communication (call) and transmission and reception of data by wireless communication via the base station. The proximity wireless communication unit 153 executes transmission and reception of data with a reader/writer corresponding to proximity wireless. The LAN communication unit 151, the mobile telephone network communication unit 152, and the proximity wireless communication unit 153 include various kinds of devices such as an encoder, a decoder, or an antenna (not illustrated in the drawings), for example. Further, the communication processor 150 may include an infrared communication unit that executes infrared communication and the like.

The sensor unit 160 is a group of sensors to detect a state of the imaging apparatus 100. In the present embodiment, the sensor unit 160 is constituted by a GPS (Global Positioning System) receiver 161, an acceleration sensor 162, a gyro sensor 163, a geomagnetic sensor 164, a light quantity sensor 165, and a proximity sensor 166, for example. Note that the sensor unit 160 may include any sensor other than these sensors.

The GPS receiver 161 receives a GPS signal transmitted from each of a plurality of satellites by using a GPS. The GPS signal received by the GPS receiver 161 is outputted to the main controller 101, for example, and a position of the imaging apparatus 100 is detected on the basis of the GPS signal in the main controller 101.

The acceleration sensor 162 measures the magnitude and a direction of acceleration (for example, gravitational acceleration) that is applied to the imaging apparatus 100. Measured values of the magnitude and the direction of the acceleration measured by the acceleration sensor 162 are outputted to the main controller 101 as acceleration information, and the acceleration applied to the imaging apparatus 100 is detected on the basis of the acceleration information in the main controller 101.

The gyro sensor 163 measures angular velocity of the imaging apparatus 100, which is generated in a case where the user moves the imaging apparatus 100. The angular velocity measured by the gyro sensor 163 is outputted to the main controller 101 as angular velocity information, for example. The angular velocity of the imaging apparatus 100 is detected on the basis of the angular velocity information in the main controller 101.

The geomagnetic sensor 164 measures the magnitude and a direction of earth magnetism that is applied to the imaging apparatus 100. Measured values of the magnitude and the direction of the earth magnetism measured by the geomagnetic sensor 164 are outputted to the main controller 101 as geomagnetic information. The earth magnetism applied to the imaging apparatus 100 is detected on the basis of the geomagnetic information in the main controller 101.

The light quantity sensor 165 measures brightness of the periphery of the imaging apparatus 100. The light quantity sensor 165 measures light quantity of the periphery of the object when an image of the object is taken, for example. A measured value of the light quantity measured by the light quantity sensor 165 is outputted to the main controller 101 as light quantity information. The light quantity of the periphery of the imaging apparatus 100 is detected on the basis of the light quantity information in the main controller 101.

The proximity sensor 166 measures a proximity status with a thing around the imaging apparatus 100. The proximity sensor 166 measures a distance and a direction of the thing around the imaging apparatus 100, for example. A measured value of the proximity status measured by the proximity sensor 166 is outputted to the main controller 101 as proximity status information. The proximity status with the thing around the imaging apparatus 100 is detected on the basis of the proximity status information in the main controller 101.

The extension interface unit 170 is a group of interfaces for expanding functions of the imaging apparatus 100. The extension interface unit 170 includes a video/audio interface 171, a USB (Universal Serial Bus) interface 172, and a memory interface 173, for example.

The video/audio interface 171 is connected to an external video/audio output apparatus, and receives an input of a video signal and/or an audio signal outputted from the video/audio output apparatus. Further, the video/audio interface 171 executes an output or the like of a video signal and/or an audio signal to the video/audio output apparatus. The USB interface 172 is connected to a USB device such as a keyboard, and executes an input and an output of information with the USB device. The memory interface 173 is connected to a memory medium such as a memory card, and executes an input and an output of data with the memory medium.

Figure 4:
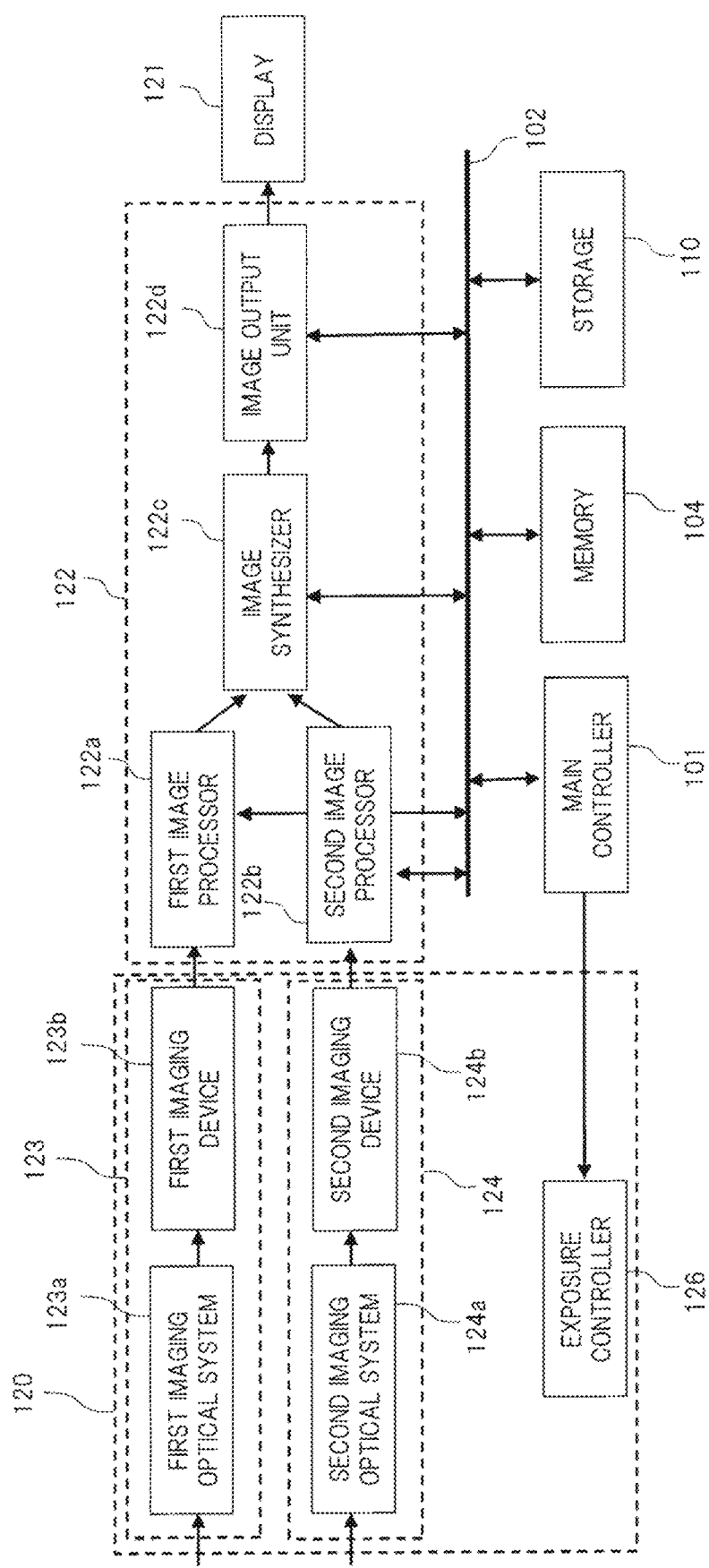
FIG. 4 is a block diagram illustrating one example of a configuration of a video signal processor and a video input unit according to the first embodiment of the present invention.

Next, the video input unit 120 and the video signal processor 122 will be described. FIG. 4 is a block diagram illustrating one example of a configuration of the video input unit and the video signal processor according to the first embodiment of the present invention. Note that the third video input unit 125 is omitted in FIG. 4.

As illustrated in FIG. 2 and FIG. 4, the video input unit 120 includes a first video input unit 123, a second video input unit 124, the third video input unit 125, and an exposure controller 126, for example. As illustrated in FIG. 1(B), the first video input unit 123 and the second video input unit 124 are provided side by side on a back surface 100b of the imaging apparatus 100, for example. As illustrated in FIG. 1(A), the third video input unit 125 is provided in the vicinity of the display 121 on the front surface 100a of the imaging apparatus 100.

In FIG. 1(B), the first video input unit 123 and the second video input unit 124 are provided on the back surface 100b of the imaging apparatus 100. However, they may be provided on the front surface 100a of the imaging apparatus 100, for example. Further, the first video input unit 123 and the second video input unit 124 may be formed integrally with each other.

As illustrated in FIG. 4, the first video input unit 123 includes a first imaging optical system 123a and a first imaging device 123b, for example. As illustrated in FIG. 4, the second video input unit 124 includes a second imaging optical system 124a and a second imaging device 124b, for example.

Each of the first imaging optical system 123a and the second imaging optical system 124a is composed of a plurality of lenses, a diaphragm (an iris diaphragm or the like), a mechanical or electronical shutter, and the like, for example. The plurality of lenses focuses incident light from the object. Each of the first imaging device 123b and the second imaging device 124b is composed of a CCD (Charge Coupled Device), a CMOS (Complementary Metal Oxide Semiconductor) or the like, for example.

Each of the first video input unit 123 and the second video input unit 124 takes an image of the object, and generates an image signal of the object. Specifically, light from the first imaging optical system 123a is stored in each pixel of the first imaging device 123b as an electric charge, whereby input light is converted into an electric signal. Further, light from the second imaging optical system 124a is also stored in each pixel of the second imaging device 124b as an electric charge, whereby input light is converted into an electric signal. The electric signals as an image signal are generated in the first imaging device 123b and the second imaging device 124b in this manner.

In the present embodiment, the first imaging device 123b is an imaging device with first resolution (high resolution), and the second imaging device 124b is an imaging device with second resolution (low resolution) that is resolution lower than that of the first imaging device 123b.

The exposure controller 126 defines a diaphragm and a shutter speed of each of the first imaging optical system 123a and the second imaging optical system 124a on the basis of an instruction from the main controller 101 to control an exposure amount to be inputted to each of the first imaging device 123b and the second imaging device 124b.

The video signal processor 122 generates a taken image of the object on the basis of the image signal. As illustrated in FIG. 4, the video signal processor 122 includes a first image processor 122a, a second image processor 122b, an image synthesizer 122c, and an image output unit 122d, for example.

The first image processor 122a is connected to the first imaging device 123b, and converts the electric signal (image signal) outputted from the first imaging device 123b into digital image data with a gradation width of predetermined bits. The first image processor 122a then executes image processing for the digital image data to generate intermediate image data suitable for HDR image synthesis. The first image processor 122a outputs the generated intermediate image data to the image synthesizer 122c. Further, the first image processor 122a outputs the taken image before synthesis to the storage 110.

The second image processor 122b is connected to the second imaging device 124b, and converts the electric signal (image signal) outputted from the second imaging device 124b into digital image data with a gradation width of predetermined bits. The second image processor 122b then executes image processing for the digital image data to generate intermediate image data suitable for HDR image synthesis. The second image processor 122b outputs the generated intermediate image data to the image synthesizer 122c. Further, the second image processor 122b outputs the taken image before synthesis to the storage 110.

The image synthesizer 122c synthesizes the two intermediate image data inputted from the first image processor 122a and the second image processor 122b to generate an HDR synthetic image as the taken image. The image synthesizer 122c outputs the generated HDR synthetic image to the storage 110.

The image output unit 122d outputs the HDR synthetic image generated by the image synthesizer 122c, the taken image before synthesis, the dynamic image, these thumbnail images and the like to the display 121 to cause the display 121 to display them.

As illustrated in FIG. 1(B), a flash unit 129 is provided adjacent to the first video input unit 123 and the second video input unit 124 on the back surface 100b of the imaging apparatus 100, for example. The flash unit 129 irradiates flash light to the object when the first video input unit 123 and the second video input unit 124 take an image of the object, for example.

The main controller (controller) 101 is composed of a computer such as a microprocessor unit. The main controller 101 executes each of the executing units 104a to 104d formed in the memory 104, whereby the function of each program is realized. The main controller 101 thus actuates each of the elements of the imaging apparatus 100.

The main controller 101 detects motion information of the object on the basis of the image signal generated by the video input unit 120. Further, the main controller 101 causes the video input unit 120 to take an image of the object multiple times on the basis of the motion information so as to differentiate an exposure amount thereof. Specifically, the main controller 101 compares the motion information with the first motion threshold value and the second motion threshold value, and causes the video input unit 120 to take an image of the object by switching respective imaging modes (will be described later) on the basis of its result. Further, the main controller 101 generates exposure information such as exposure amounts regarding the first video input unit 123 and the second video input unit 124, shutter speed, or a diaphragm on the basis of the image signal or the taken image. The main controller 101 outputs the generated exposure information to the video input unit 120. Further, the main controller 101 causes the video signal processor 122 to generate the HDR synthetic image of the object on the basis of a plurality of image signals whose exposure amounts are different from each other.

Next, an imaging method according to the present embodiment will be described. In the present embodiment, for example, various kinds of programs in the camera function program storage area 110b or the like illustrated in FIG. 3 are developed on the memory 104, and the main controller 101 executes each of the executing units such as the camera function executing unit 104b, whereby an operation related to taking an image is executed.

Figure 5:
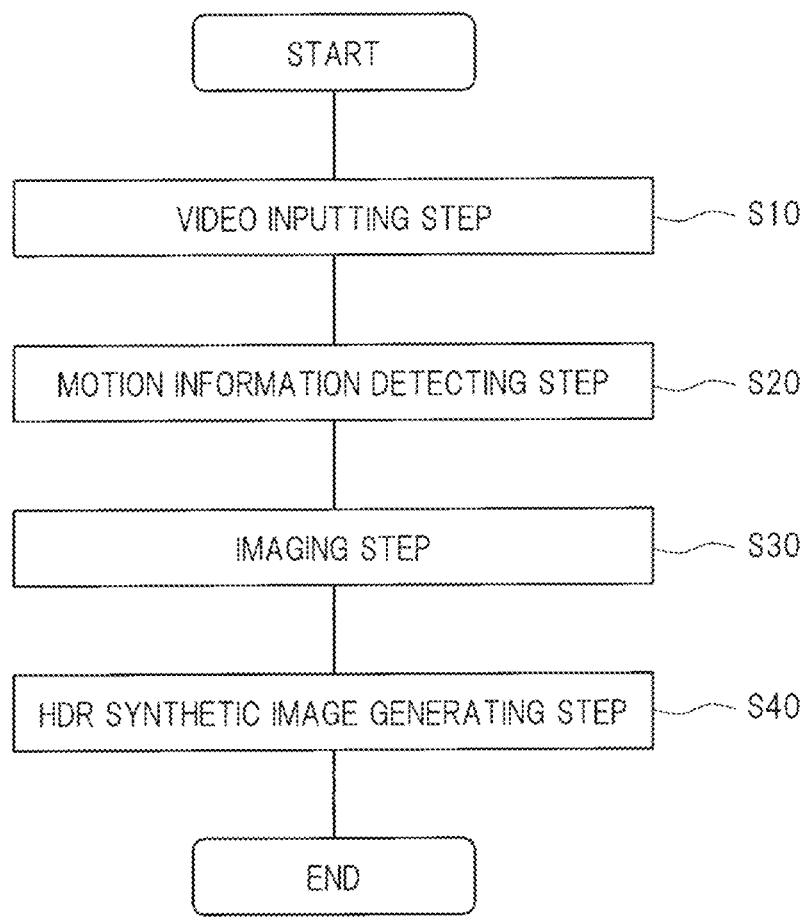
FIG. 5 is a flowchart related to an imaging method according to the first embodiment of the present invention.

FIG. 5 is a flowchart of the imaging method according to the first embodiment of the present invention. As illustrated in FIG. 5, a video inputting step S10, a motion information detecting step S20, an imaging step S30, and an HDR synthetic image generating step S40 are executed when an image is taken.

When an instruction for taking an image is made from the operating unit 140, the operation related to taking an image of the object is started. At the video inputting step S10, the video input unit 120 takes an image of the object to generate an image signal of the object. The first video input unit 123 and the second video input unit 124 take an image of the object, and generate electric signals as image signals in the first imaging device 123b and the second imaging device 124b. The first imaging device 123b outputs the generated electric signal to the first image processor 122a of the video signal processor 122, and the second imaging device 124b outputs the generated electric signal to the second image processor 122b of the video signal processor 122. Here, the case where both the first video input unit 123 and the second video input unit 124 take an image of the object has been explained. However, only any of the video input units may take an image of the object. The processing flow then shifts to the motion information detecting step S20.

Figure 6:
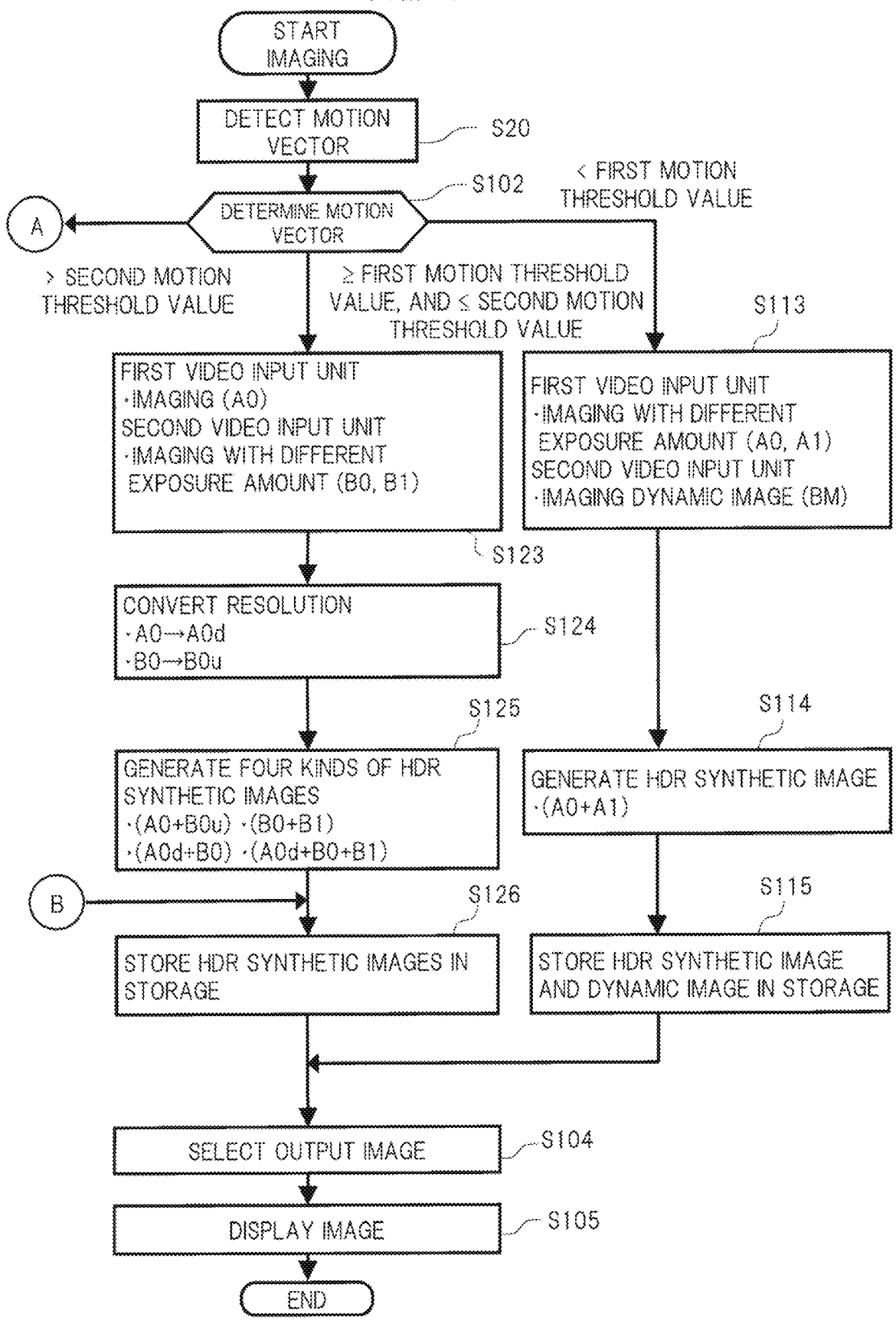
FIG. 6 is a flowchart illustrating one example of processes at a motion information detecting step, an imaging step, a taken image generating step and the like according to the first embodiment of the present invention.
Figure 7:
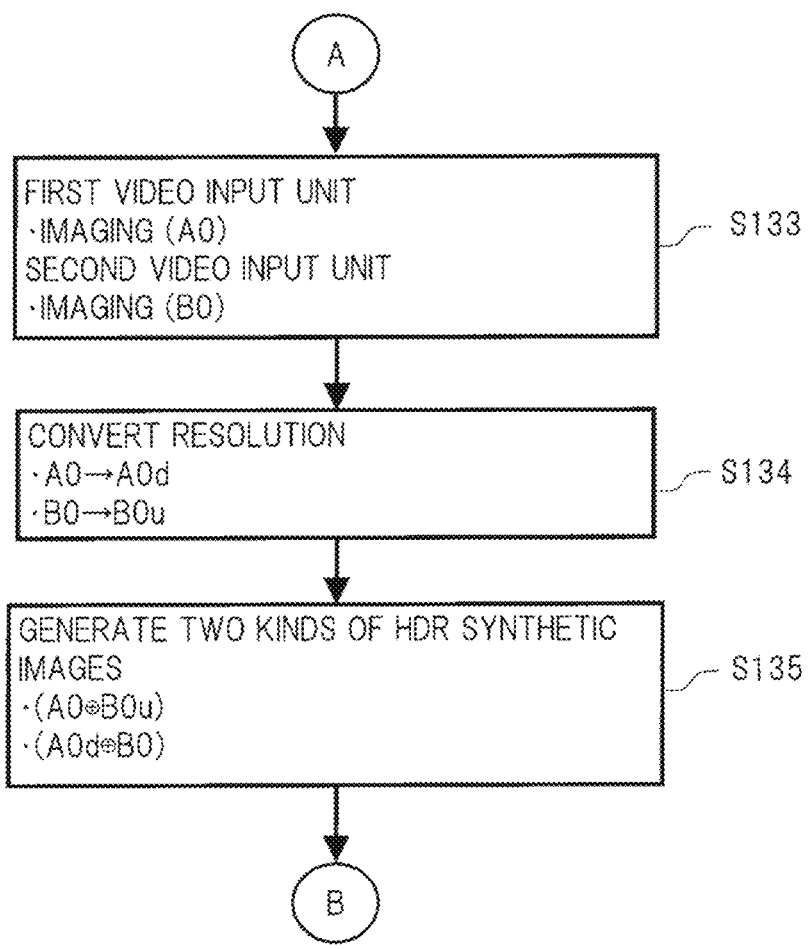
FIG. 7 is a flowchart illustrating one example of the motion information detecting step, the imaging step, the taken image generating step and the like according to the first embodiment of the present invention.

FIG. 6 and FIG. 7 are a flowchart illustrating one example of processes at the motion information detecting step, the imaging step, the taken image generating step and the like according to the first embodiment of the present invention. At the motion information detecting step S20, the main controller 101 detects the motion information of the object on the basis of the image signal. Specifically, the first image processor 122a of the video signal processor 122 outputs the electric signal outputted from the first imaging device 123b to the main controller 101. The second image processor 122b of the video signal processor 122 outputs the electric signal outputted from the second imaging device 124b to the main controller 101. Note that the first image processor 122a and the second image processor 122b may generate a taken image on the basis of the electric signal and output the generated taken image to the main controller 101.

The main controller 101 detects the motion information (for example, motion vector) of the object on the basis of these inputted electric signals (image signals). The main controller 101 uses a well-known block matching method or the like for these image signals to detect the motion vector of the object. Note that the main controller 101 may detect the motion information of the object on the basis of the inputted taken image. The processing flow then shifts to the imaging step S30.

At the imaging step S30, the video input unit 120 takes an image of the object multiple times on the basis of the motion information detected at the motion information detecting step S20 so as to differentiate an exposure amount thereof. At the imaging step S30, a process at Step S102 is executed. At Step S102, motion of the object is determined on the basis of the motion information. Specifically, the main controller 101 compares the motion vector detected at the motion information detecting step S20 with the first motion threshold value and the second motion threshold value, thereby determining the motion of the object. Specifically, the main controller 101 reads out the first motion threshold value and the second motion threshold value stored in the storage 110 to the memory 104, and compares the motion vector with the first motion threshold value and the second motion threshold value.

[Still Image Imaging Mode]

In a case where the main controller 101 determines that the magnitude of the motion vector is less than the first motion threshold value at Step S102, a process at Step S113 is executed. Namely, the main controller 101 determines that the object hardly moves, and switches into a still image imaging mode.

Figure 9:
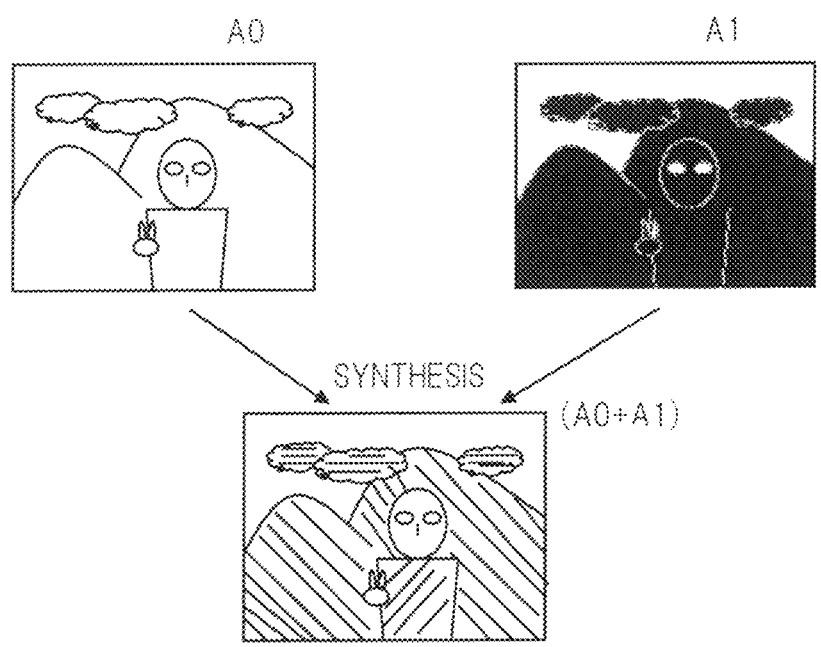
FIG. 9 is a view schematically illustrating an HDR synthesizing process according to the first embodiment of the present invention.

FIG. 8 is a view illustrating a timing chart of the imaging according to the first embodiment of the present invention. FIG. 9 is a view schematically illustrating an HDR synthesizing process according to the first embodiment of the present invention. At Step S113, for example, as illustrated in FIG. 8(A), the first video input unit 123 takes an image of the object in succession so as to differentiate an exposure amount thereof. Specifically, the main controller 101 determines the exposure amount (for example, shutter speed, a diaphragm value and the like) whenever an image is taken on the basis of the electric signal (image signal) outputted from the first imaging device 123b or the second imaging device 124b. For example, as illustrated in FIG. 8(A), the main controller 101 sets the exposure amount on taking an image first time to an exposure amount $L_{A0}$ at which a dark portion at a low light quantity side does not become under-exposure, and sets the exposure amount on taking an image second time to an exposure amount $L_{A1}$ at which a bright portion at a high light quantity side does not become overexposure, for example. The exposure amount $L_{A1}$ is smaller than the exposure amount $L_{A0}$ ($L_{A0}$>$L_{A1}$). The main controller 101 outputs information regarding the determined exposure amount to the video input unit 120 as exposure information. In the video input unit 120, on the basis of the inputted exposure information, the first video input unit 123 takes an image of the object with the exposure amount $L_{A0}$ first time, and takes an image of the object with the exposure amount $L_{A1}$ second time.

Whenever an image of the object is taken, the first imaging device 123b generates an electric signal regarding the taken image as illustrated in FIG. 9, for example. Whenever an image of the object is taken, the first imaging device 123b generates an electric signal (A0) with the exposure amount $L_{A0}$ and an electric signal (A1) with the exposure amount $L_{A1}$ as illustrated in FIG. 9, for example, and outputs the generated electric signals (A0, A1) to the first image processor 122a of the video signal processor 122. Here, the case where the image of the object is taken twice so as to differentiate the exposure amount thereof has been described. However, the image of the object may be taken three times or more, for example.

On the other hand, the second video input unit 124 takes a dynamic image (Bm) of the object, for example. Further, the second video input unit 124 may take an image of the object so as to differentiate a depth of field thereof by changing diaphragm values, for example. The second imaging device 124b outputs an image signal regarding the dynamic image and the like to the second image processor 122b of the video signal processor 122. The processing flow then shifts to the HDR synthetic image generating step S40.

At the HDR synthetic image generating step S40, a process at Step S114 is executed. At Step S114, an HDR synthetic image with the first resolution is generated on the basis of the plurality of image signals (A0, A1) whose exposure amounts are different from each other and that is generated at Step S113. Specifically, the first image processor 122a of the video signal processor 122 converts each of the electric signals (A0, A1) inputted from the first imaging device 123b into digital image data with a gradation width of predetermined bits. The first image processor 122a then executes image processing for the respective digital image data to generate respective intermediate image data suitable for HDR image synthesis. The first image processor 122a outputs the respective intermediate image data to the image synthesizer 122c. Further, the first image processor 122a generates respective taken images before synthesis on the basis of the electric signals (A0, A1). Further, the first image processor 122a generate thumbnail images corresponding to the respective taken images before synthesis.

The second image processor 122b generates a dynamic image on the basis of the image signal inputted from the second video input unit 124, or generates a taken image so as to differentiate a depth of field thereof. Further, the second image processor 122b generates thumbnail images respectively corresponding to the generated dynamic image and the generated taken image.

The image synthesizer 122c generates an HDR synthetic image (taken image) (A0+A1) with the first resolution (high resolution) as illustrated in FIG. 9 by weighting and synthesizing the respective intermediate image data inputted from the first image processor 122a, for example. The HDR synthetic image (A0+A1) generated in this manner allows underexposure of a dark portion and/or overexposure of a bright portion to be solved, thereby becoming an image close to a scene that the user sees with the naked eye.

Further, the image synthesizer 122c generates a thumbnail image corresponding to the generated HDR synthetic image.

Note that each of the first image processor 122a and the second image processor 122b may convert an image signal with high resolution into an image signal with low resolution, and the image synthesizer 122c generates an HDR synthetic image with low resolution. The processing flow then shifts to Step S115.

At Step S115, the HDR synthetic image generated at Step S114, the taken images before synthesis, the dynamic image, the thumbnail image and the like are stored in the storage 110. Specifically, the image synthesizer 122c outputs the generated HDR synthetic image (A0+A1) and the thumbnail image to the storage 110, and the storage 110 stores therein the inputted HDR image synthesis (A0+A1) and the thumbnail image. Further, each of the first image processor 122a and the second image processor 122b outputs the taken image before synthesis, the dynamic image, and the thumbnail image to the storage 110, and the storage 110 stores therein the inputted taken images before synthesis, the dynamic images, and the thumbnail images. When these processes are executed, the process at the HDR synthetic image generating step S40 is completed, and the processing flow shifts to Step S104. A process at Step S104 will be described later.

[Micromotion Imaging Mode]

FIG. 10 and FIG. 11 are views schematically illustrating the HDR synthesizing process according to the first embodiment of the present invention. In a case where the main controller 101 determines that the motion vector is equal to or more than the first motion threshold value at Step S102 of the imaging step S30, a process at Step S123 or Step S133 is executed. Specifically, in a case where the main controller 101 determines that the magnitude of the motion vector is equal to or more than the first motion threshold value and is equal to or less than the second motion threshold value, the process at Step S123 is executed. Namely, the main controller 101 determines that the motion of the object is greater compared with that in the still image imaging mode but the motion is smaller than a moving object imaging mode (will be described later), and switches into a micromotion imaging mode.

At Step S123, the main controller 101 causes the first video input unit 123 and the second video input unit 124 to take an image of the object at the same time so as to differentiate an exposure amount thereof, and then causes the second video input unit 124 to take an image of the object so as to differentiate the exposure amount thereof. Specifically, as illustrated in FIG. 8(B), the main controller 101 sets the exposure amount on taking an image by the first video input unit 123 to the exposure amount $L_{A0}$ at which a dark object at a low light quantity side does not become underexposure, for example. In other words, the first video input unit 123 takes an image of the object with suitable exposure. The suitable exposure herein means that an image of a dark object at a low light quantity side is taken with a sufficient exposure amount. Further, the main controller 101 sets the exposure amount on taking an image first time by the second video input unit 124 to an exposure amount $L_{B0}$ between an exposure amount at which the low light quantity side may become underexposure and an exposure amount at which the high light quantity side may become overexposure, for example, and sets the exposure amount on taking an image second time by the second video input unit 124 to the exposure amount $L_{A1}$ at which a bright portion does not become overexposure, for example. The exposure amount $L_{A1}$ is smaller than exposure amount $L_{B0}$ ($L_{A0}$>$L_{B0}$>$L_{B0}$.

Further, since resolution of the second imaging device 124b is lower than that of the first imaging device 123b, the second video input unit 124 can acquire the same exposure amount even for a shorter imaging time (faster shutter speed) than that of the first video input unit 123. Therefore, since it is possible to shorten an imaging interval (time difference) by the second video input unit 124 compared with the first video input unit 123, it is possible to keep occurrence of noise due to micromotion of the object down when the HDR synthesizing process is executed.

The main controller 101 outputs information regarding the determined exposure amount to the video input unit 120 as exposure information. In the video input unit 120, on the basis of the inputted exposure information, the first video input unit 123 takes an image of the object with the exposure amount $L_{A0}$, the second video input unit 124 takes an image of the object with the exposure amount $L_{B0}$ first time, and takes an image of the object with exposure amount $L_{B1}$ second time.

The first imaging device 123b generates the electric signal (A0) with the exposure amount $L_{A0}$ as illustrated in FIG. 10(A), for example, and outputs the generated electric signal (A0) to the first image processor 122a of the video signal processor 122.

Whenever an image of the object is taken, the second imaging device 124b generates an electric signal (B0) of the exposure amount $L_{B0}$ and an electric signal (B1) of the exposure amount $L_{B1}$ as illustrated in FIG. 10(A), for example, and outputs the generated electric signals (B0, B1) to the second image processor 122b of the video signal processor 122. The processing flow then shifts to the HDR synthetic image generating step S40.

At the HDR synthetic image generating step S40, a process at Step S124 is first executed. At Step S124, the resolution of the taken image of the electric signal generated at Step S123 is converted. Specifically, the main controller 101 causes the video signal processor 122 to convert the resolution of the image signal generated by the first video input unit 123 into the second resolution, and to convert the resolution of the image signal generated by the second video input unit 124 into the first resolution.

Specifically, the main controller 101 causes the first image processor 122a to convert resolution of the electric signal (A0) generated by the first imaging device 123b from the first resolution to the second resolution, and causes the second image processor 122b to convert resolution of the electric signal (B0) generated by the second imaging device 124b from the second resolution to the first resolution. More specifically, the first image processor 122a executes resolution conversion for the electric signal (A0) with the first resolution to generate an electric signal (A0d) with the second resolution illustrated in FIG. 10(B). The second image processor 122b executes resolution conversion for the electric signal (B0) with the second resolution, and generates an electric signal (B0u) with the first resolution illustrated in FIG. 10(A) by executing a process such as an interpolating process, for example. The processing flow then shifts to Step S125.

At Step S125, an HDR synthetic image with the first resolution and an HDR synthetic image with the second resolution are generated on the basis of the plurality of image signals (A0, B0, B1, A0d, B0u) generated at Step S124. Specifically, the first image processor 122a converts each of the electric signal (A0) with the first resolution and the electric signal (A0d) with the second resolution into digital image data with a gradation width of predetermined bits. The first image processor 122a then executes image processing for the respective digital image data to generate intermediate image data suitable for HDR image synthesis. The first image processor 122a outputs the respective intermediate image data to the image synthesizer 122c. Further, the first image processor 122a generates respective taken images before synthesis on the basis of the electric signals (A0, A0d). Further, the first image processor 122a generates a thumbnail image corresponding to each of the taken images before synthesis.

The second image processor 122b converts each of the electric signals (B0, B1) with the second resolution and the electric signal (B0u) with the first resolution into digital image data with a gradation width of predetermined bits. The second image processor 122b then executes image processing for the respective digital image data to generate respective intermediate image data suitable for HDR image synthesis. The second image processor 122b outputs the respective intermediate image data to the image synthesizer 122c. Further, the second image processor 122b generates respective taken images before synthesis on the basis of the electric signals (B0, B1, B0u). Further, the second image processor 122b generates thumbnail images respectively corresponding to the generated taken images before synthesis.

The image synthesizer 122c generates an HDR synthetic image with the first resolution and an HDR synthetic image with the second resolution by weighting and synthesizing the respective intermediate image data outputted from the first image processor 122a and the respective intermediate image data outputted from the second image processor 122b.

Specifically, the image synthesizer 122c generates an HDR synthetic image (A0+B0u) with the first resolution illustrated in FIG. 10(A), for example, on the basis of the intermediate image data of the electric signal (A0) and the intermediate image data of the electric signal (B0u). Further, the image synthesizer 122c generates an HDR synthetic image (A0d+B0) with the second resolution illustrated in FIG. 10(B) on the basis of the intermediate image data of the electric signal (A0d) and the intermediate image data of the electric signal (B0), for example. Further, the image synthesizer 122c generates an HDR synthetic image (B0+B1) with the second resolution illustrated in FIG. 11(A) on the basis of the intermediate image data of the electric signal (B0) and the intermediate image data of the electric signal (B1), for example. Further, the image synthesizer 122c generates an HDR synthetic image (A0d+B0+B1) with the second resolution illustrated in FIG. 11(B) on the basis of the intermediate image data of the electric signal (A0d) and the intermediate image data of the electric signals (B0, B1), for example. Further, the image synthesizer 122c generates a thumbnail image corresponding to the generated HDR synthetic image.

When the user views or browses the HDR synthetic images later, the user may select one, which is visually determined to be the best, from these images, and treats the one as an image of a final processing result by being subjected to the HDR synthesizing process. The processing flow then shifts to Step S126.

At Step S126, the HDR synthetic images generated at Step S125, the taken images before synthesis, the thumbnail images and the like are stored in the storage 110. Specifically, the image synthesizer 122c outputs the generated HDR synthetic images (A0+B0u), (A0d+B0), (B0+B1) and (A0d+B0+B1), and the thumbnail images to the storage 110, and the storage 110 stores therein the inputted HDR image synthesis (A0+B0u), (A0d+B0), (B0+B1) and (A0d+B0+B1), and the thumbnail images. Further, each of the first image processor 122a and the second image processor 122b outputs a taken image before synthesis and a thumbnail image to the storage 110, and the storage 110 stores therein the inputted taken image before synthesis and thumbnail image. When these processes are executed, the process at the HDR synthetic image generating step S40 is completed, and the processing flow then shifts to Step S104. A process at Step S104 will be described later.

[Moving Object Imaging Mode]

At Step S102 of the imaging step S30, in a case where the main controller 101 determines that the motion vector exceeds the second motion threshold value, a process at Step S133 is executed. Namely, the main controller 101 determines that the motion of the object is greater than the micromotion imaging mode, and switches into a moving object imaging mode.

At Step S133, a process similar to the process at Step S123 is executed. Namely, at Step S123, the main controller 101 causes the first video input unit 123 and the second video input unit 124 to take an image of the object at the same time so as to differentiate exposure amounts thereof. The first video input unit 123 takes an image of the object with the exposure amount $L_{A0}$, for example, to generate the electric signal (A0) for the taken image with the first resolution as illustrated in FIGS. 10(A) and 10(B). The second video input unit 124 takes an image of the object with the exposure amount $L_{B0}$, for example, to generate the electric signal (B0) for the taken image with the second resolution as illustrated in FIGS. 10(A) and 10(B). Note that in the moving object imaging mode, the second video input unit 124 does not take an image of the object with time differences unlike the micromotion imaging mode. This is because the motion of the object is greater, and thus, deflection of the object in the generated HDR synthetic image becomes marked when an image of the object is taken with time intervals.

The first imaging device 123b outputs the electric signal (A0) of the exposure amount $L_{A0}$ to the first image processor 122a. The second imaging device 124b outputs the electric signal (B0) with the exposure amount $L_{B0}$ to the second image processor 122b. The processing flow then shifts to the HDR synthetic image generating step S40.

At the HDR synthetic image generating step S40, a process at Step S134 is first executed. At Step S134, the process similar to the process at Step S124 described above is executed. Namely, at Step S134, the first image processor 122a executes resolution conversion for the electric signal (A0) with the first resolution to generate the electric signal (A0d) with the second resolution illustrated in FIG. 10(B), for example. The second image processor 122b executes resolution conversion for the electric signal (B0) with the second resolution to generate the electric signal (B0u) with the first resolution illustrated in FIG. 10(A). The processing flow then shifts to Step S135.

At Step S135, a process substantially similar to the process at Step S125 described above is executed. Namely, at Step S135, an HDR synthetic image with the first resolution and an HDR synthetic image with the second resolution are generated on the basis of the plurality of image signals (A0, B0, A0d, B0u) generated at Step S134. Specifically, the image synthesizer 122c generates the HDR synthetic image (A0+B0u) with the first resolution illustrated in FIG. 10(B) and the HDR synthetic image (A0d+B0) with the second resolution illustrated in FIG. 10(A). Further, each of the first image processor 122a and the second image processor 122b generates a taken image before synthesis and a thumbnail image corresponding to the taken image before synthesis.

When the user views or browses the HDR synthetic images later, the user may select one, which is visually determined to be the best, from these images, and treats the one as an image of a final processing result by being subjected to the HDR synthesizing process. The processing flow then shifts to Step S126.

At Step S126, the HDR synthetic images generated at Step S135, the taken images before synthesis, the thumbnail images and the like are stored in the storage 110. Specifically, the image synthesizer 122c outputs the generated HDR synthetic images (A0+B0u) and (A0d+B0), and the thumbnail images to the storage 110, and the storage 110 stores therein the inputted HDR image synthesis (A0+B0u) and (A0d+B0), and the thumbnail images. Further, each of the first image processor 122a and the second image processor 122b outputs a taken image before synthesis and a thumbnail image to the storage 110, and the storage 110 stores therein the inputted taken image before synthesis and thumbnail image. When these processes are executed, the process at the HDR synthetic image generating step S40 is completed, and the processing flow then shifts to Step S104.

At Step S104, an image to be displayed on the display 121 and the like are selected. Specifically, the image to be displayed on the display 121 and the like are selected among the images generated at each of Steps S114, S125, S135 for the respective imaging modes and stored in the storage 110 (including the HDR synthetic image, the taken image before synthesis, and the dynamic image).

For example, the storage 110 outputs information regarding the stored images (for example, the thumbnail images) to the image output unit 122d. The image output unit 122d outputs the inputted thumbnail images to the display 121. The display 121 displays the inputted thumbnail images thereon. The user selects the image or the like displayed on the display 121 from the displayed thumbnail images. The processing flow then shifts to Step S105.

At Step S105, the image or the like corresponding to the selected thumbnail image is displayed. Specifically, the image output unit 122d outputs the image or the like corresponding to the thumbnail image selected by the user from the storage 110, for example. The image output unit 122d outputs the image read out therefrom to the display 121. The display 121 displays the inputted image or the like.

Note that the user may arbitrarily select the image or the like to be displayed on the display 121, the preference order to be displayed may be registered in advance in the imaging apparatus 100, and the images and the like may be displayed in turn in accordance with this order.

Further, the image and the like to be displayed on the display 121 may be expanded or reduced appropriately in accordance with resolution of the display 121. In this case, a plurality of images or the like may be displayed with the same size, or the plurality of images or the like may be displayed with respective different sizes in accordance with resolution of the selected image or the like.

Note that the imaging apparatus 100 according to the present embodiment is not limited to the configuration illustrated in FIG. 2. For example, the imaging apparatus 100 may not include the communication processor 150 or the sensor unit 160, or may include various kinds of functions such as a digital television broadcasting receiving function or an electronic money settlement function.

According to the present embodiment, on the basis of the motion vector of the object, the main controller 101 causes the video input unit 120 to take an image of the object multiple times so as to differentiate an exposure amount thereof, and causes the video signal processor 122 to generate an HDR synthetic image of the object on the basis of the plurality of image signals whose exposure amounts are different from each other.

According to this configuration, it is possible to select an appropriate imaging mode based on motion of the object. Therefore, it is possible to generate a high-quality HDR synthetic image compatible with imaging environment such as motion of the object or camera shake.

Further, according to the present embodiment, in a case where the main controller 101 determines that the magnitude of the motion vector is less than the first motion threshold value, the main controller 101 switches into the still image imaging mode. The main controller 101 causes the first video input unit 123 including the first imaging device 123b first resolution that is high resolution to take an image of the object in succession so as to differentiate an exposure amount thereof, and causes the video signal processor 122 to generate an HDR synthetic image with the first resolution on the basis of the plurality of image signals (A0, A1) whose exposure amounts are different from each other.

According to this configuration, the object hardly moves in the still image imaging mode. Therefore, even though an image of the object is taken with time intervals, it is possible to keep occurrence of noise due to motion of the object down in the HDR synthetic image. This makes it possible to take an image of the object in succession by using only an imaging device with high resolution. Therefore, it is possible to generate a high-quality HDR synthetic image.

Further, according to this configuration, the electric signal (A0) generated by taking an image of a dark object at a low light quantity side with a sufficient exposure amount and the electric signal (A1) generated by taking an image of a bright object at a high light quantity side while suppressing the exposure amount are synthesized. Therefore, a high-quality HDR synthetic image whose dynamic range is expanded is generated.

Further, according to the present embodiment, in a case where the main controller 101 determines that the motion vector is equal to or more than the first motion threshold value, the main controller 101 switches into the micromotion imaging mode or the moving object imaging mode. The main controller 101 causes the first video input unit 123 and the second video input unit 124 to take an image of the object at the same time so as to differentiate exposure amounts thereof, and causes the video signal processor 122 to convert the image signal with the first resolution into the image signal with the second resolution and to convert the image signal with the second resolution into the image signal with the first resolution to generate the HDR synthetic image with the first resolution and the HDR synthetic image with the second resolution.

According to this configuration, even in a case where the object moves, the HDR synthetic image is generated on the basis of the plurality of image signals obtained by taking an image at the same time. Therefore, it is possible to suppress an influence of noise caused by motion of the object or camera shake, and a high-quality HDR synthetic image in which a dynamic range thereof is expanded is generated.

Further, according to this configuration, since the plurality of HDR images whose resolution is different from each other is generated, it is possible to provide the HDR images suitable for use application of the user.

Further, according to the present embodiment, in a case where the main controller 101 determines that the motion vector is equal to or more than the first motion threshold value and is equal to or less than the second motion threshold value, the main controller 101 switches into the micromotion imaging mode. The main controller 101 causes the first video input unit 123 and the second video input unit 124 to take an image of the object at the same time so as to differentiate exposure amounts thereof, and then causes the second video input unit 124 to take an image of the object so as to differentiate an exposure amount thereof.

According to this configuration, the HDR synthesizing process is executed on the basis of at least three kinds of image signals whose exposure amounts are different from each other. Therefore, it is possible to generate the HDR synthetic image with higher quality.

Further, according to the present embodiment, the resolution of the second imaging device 124b is lower than the resolution of the first imaging device 123b.

According to this configuration, the second video input unit 124 can acquire the same exposure amount even in the imaging time shorter than that of the first video input unit 123. This makes it possible to suppress occurrence of noise due to motion of the object even though the second video input unit 124 takes an image of the object with time intervals. Therefore, it is possible to suppress occurrence of noise due to motion of the object in the HDR synthetic image.

Further, according to this configuration, it is possible to lower the cost of the second imaging device 124. This makes it possible to lower a manufacturing cost of the imaging apparatus 100.

Further, according to the present embodiment, the display 121 displays the thumbnail image such as the HDR synthetic image. When the thumbnail image is selected, the display 121 displays the HDR synthetic image corresponding to the selected thumbnail image.

According to this configuration, the user is allowed to readily identify the HDR synthetic images and the like stored in the storage 110. Therefore, it is possible to reduce a load when the user selects the HDR image or the like to be displayed on the display 121.

Further, according to the present embodiment, the imaging method includes: the video inputting step S10 of causing the video input unit 120 to take an object of an object to generate an image signal of the object; the motion information detecting step S20 of detecting motion information of the object on the basis of the image signal by the main controller 101; the imaging step S30 of causing the video input unit 120 to take an image of the object multiple times on the basis of the motion information so as to differentiate an exposure amount thereof by the main controller 101; and the HDR synthetic image generating step S40 of causing the video signal processor 122 to generate an HDR synthetic image of the object on the basis of a plurality of image signals whose exposure amounts are different from each other.

According to this configuration, it is possible to select an appropriate imaging mode based on motion of the object and take an image of the object. Therefore, it is possible to provide an imaging method capable of generating a high-quality HDR synthetic image compatible with imaging environment.

Further, according to the present embodiment, the main controller 101 that is a computer is caused to execute: the video inputting step S10 of causing the video input unit 120 to take an object of an object to generate an image signal of the object; the motion information detecting step S20 of detecting motion information of the object on the basis of the image signal; the imaging step S30 of causing the video input unit 120 to take an image of the object multiple times on the basis of the motion information so as to differentiate an exposure amount thereof, and the HDR synthetic image generating step S40 of causing the video signal processor 122 to generate an HDR synthetic image of the object on the basis of a plurality of image signals whose exposure amounts are different from each other.

According to this configuration, it is possible to select an appropriate imaging mode based on motion of the object and take an image of the object. Therefore, it is possible to provide an imaging program capable of generating a high-quality HDR synthetic image compatible with imaging environment.

Second Embodiment

Next, a second embodiment will be described. In the present embodiment, a case where imaging modes are switched on the basis of motion and light quantity of an object will be described. Hereinafter, detailed explanation of overlapped portions with those according to the first embodiment described above may be omitted appropriately.

Figure 12:
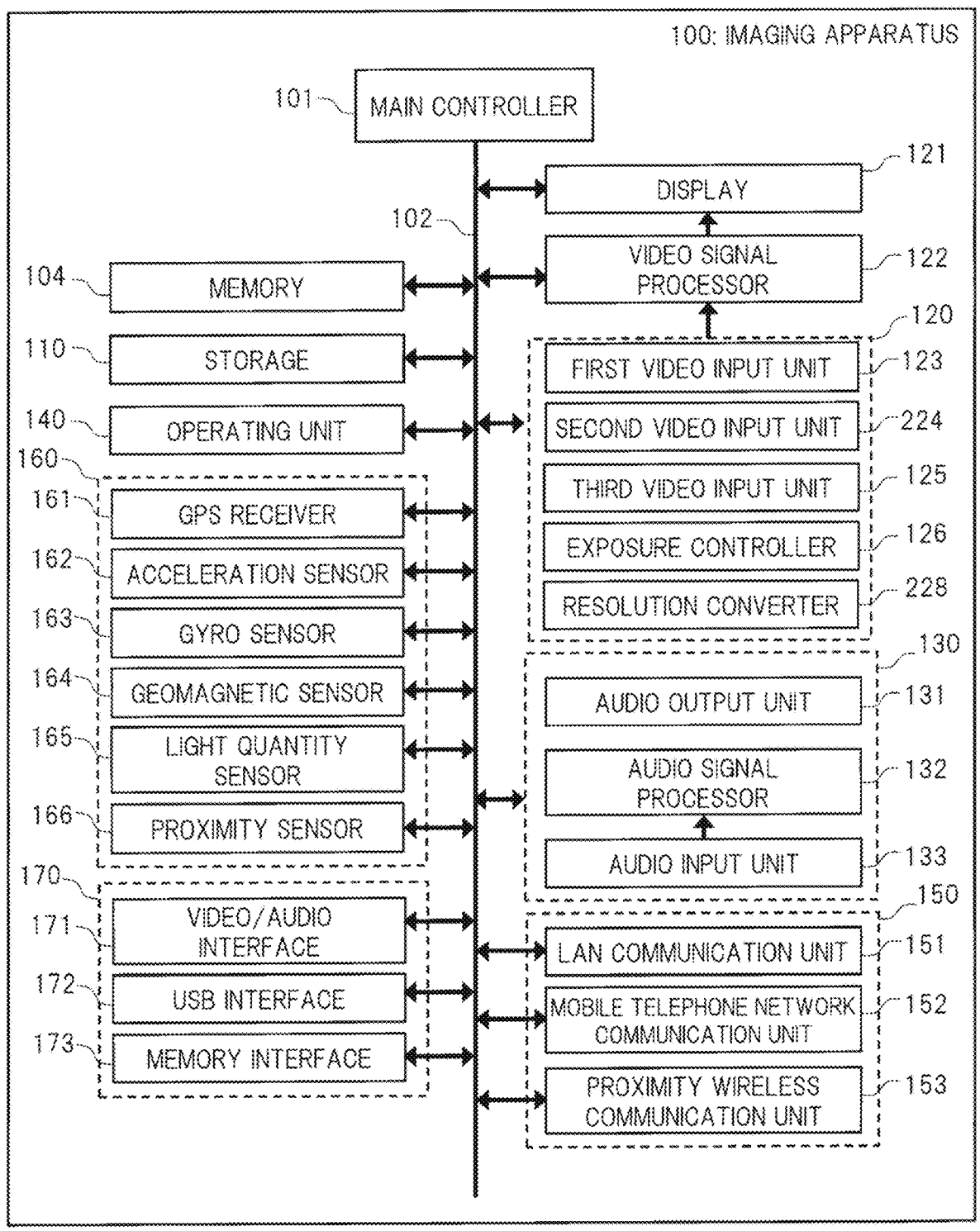
FIG. 12 is a block diagram illustrating one example of a configuration of the imaging apparatus according to a second embodiment of the present invention.
Figure 13:
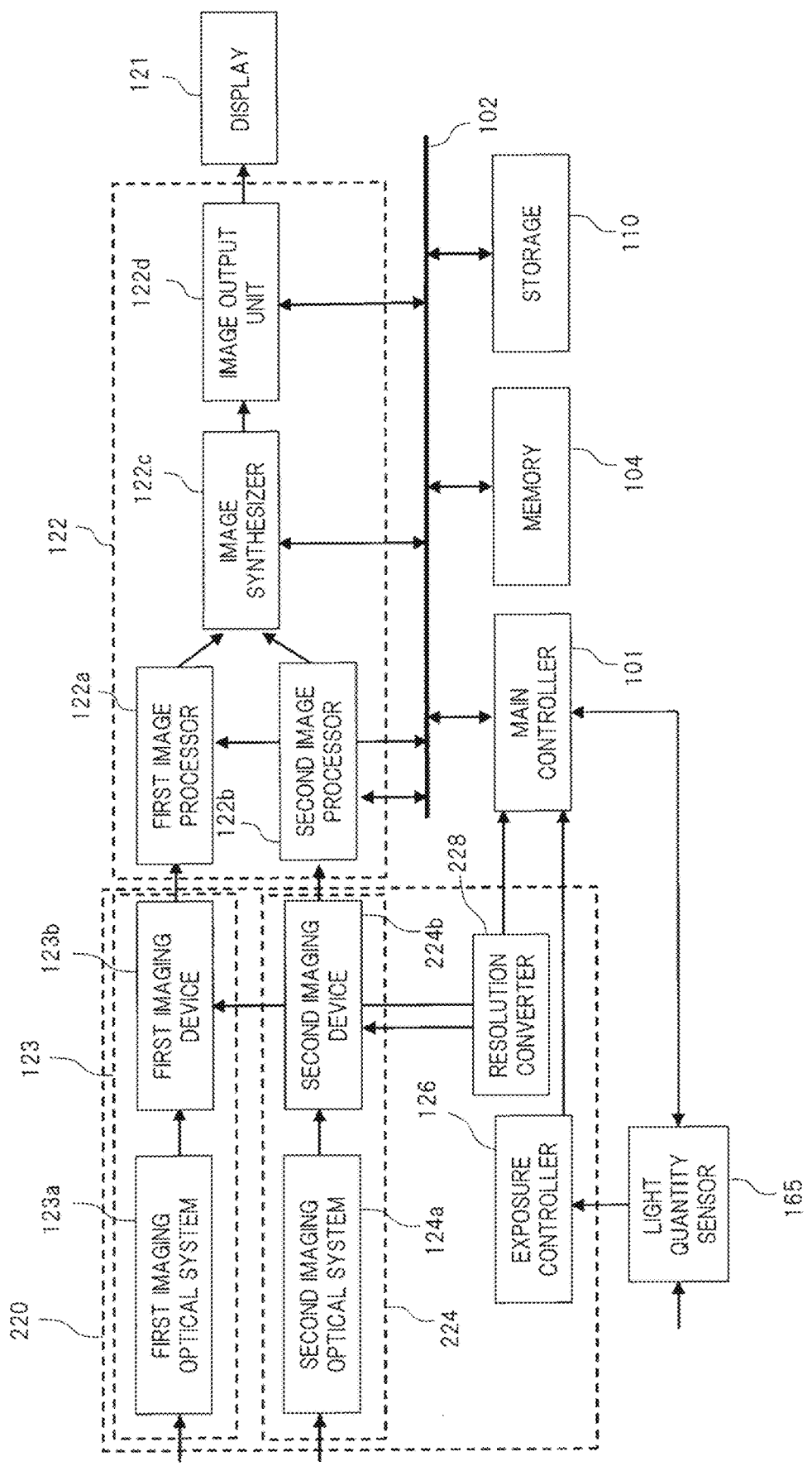
FIG. 13 is a block diagram illustrating one example of a configuration of the imaging apparatus according to the second embodiment of the present invention.

FIG. 12 and FIG. 13 are block diagrams illustrating one example of a configuration of an imaging apparatus according to the second embodiment of the present invention. As illustrated in FIG. 12, an imaging apparatus 200 includes a video input unit 220 and the like.

As illustrated in FIG. 12 and FIG. 13, the video input unit 220 includes a second video input unit 224, a resolution converter 228, and the like. The second video input unit 224 includes a second imaging device 224b. The second imaging device 224b is an imaging device with first resolution (high resolution) as well as the first imaging device 123b. The first imaging device 123b and the second imaging device 224b are configured so that resolution is converted appropriately.

The light quantity sensor 165 measures light quantity in the vicinity of the periphery of the imaging apparatus 200 or the object. The light quantity sensor 165 then outputs the measured light quantity information to the exposure controller 126 and the main controller 101.

For example, the exposure controller 126 sets an exposure amount when the first video input unit 123 and the second video input unit 224 take an image on the basis of the light quantity information outputted from the light quantity sensor 165 and an instruction from the main controller 101.

The main controller 101 switches imaging modes on the basis of the light quantity measured by the light quantity sensor 165 and a detecting result of motion vector of the object. Further, the main controller 101 causes the resolution converter 228 to group a plurality of pixels, thereby converting resolution of each of the first imaging device 123b and the second imaging device 224b from the first resolution (high resolution) to second resolution (low resolution). Further, the main controller 101 causes the resolution converter 228 to release the grouping of the plurality of pixels, thereby converting the resolution of each of the first imaging device 123b and the second imaging device 224b from the second resolution (low resolution) to the first resolution (high resolution).

For example, the main controller 101 outputs resolution conversion information to the resolution converter 228. The resolution conversion information is used to convert the resolution of each of the first imaging device 123b and the second imaging device 224b in accordance with the imaging mode. The resolution converter 228 converts the resolution of each of the first imaging device 123b and the second imaging device 224b on the basis of the resolution conversion information. In the imaging device whose resolution is converted into low resolution, a plurality of grouped pixels is set to one pixel. Herewith, an exposure amount in one pixel after grouping is increased compared with one pixel before grouping. Therefore, it is possible to shorten an exposure time (shutter speed) to acquire the same exposure amount.

The light quantity sensor 165 measures light quantity of the object from a region of high luminosity to a region of low luminosity. FIG. 12 and FIG. 13 illustrate a case where the light quantity sensor 165 is provided independently. However, the light quantity sensor 165 is not limited to such a configuration. For example, the first imaging device 123b or the second imaging device 224b may also be provided with a function of the light quantity sensor 165.

Figure 14:
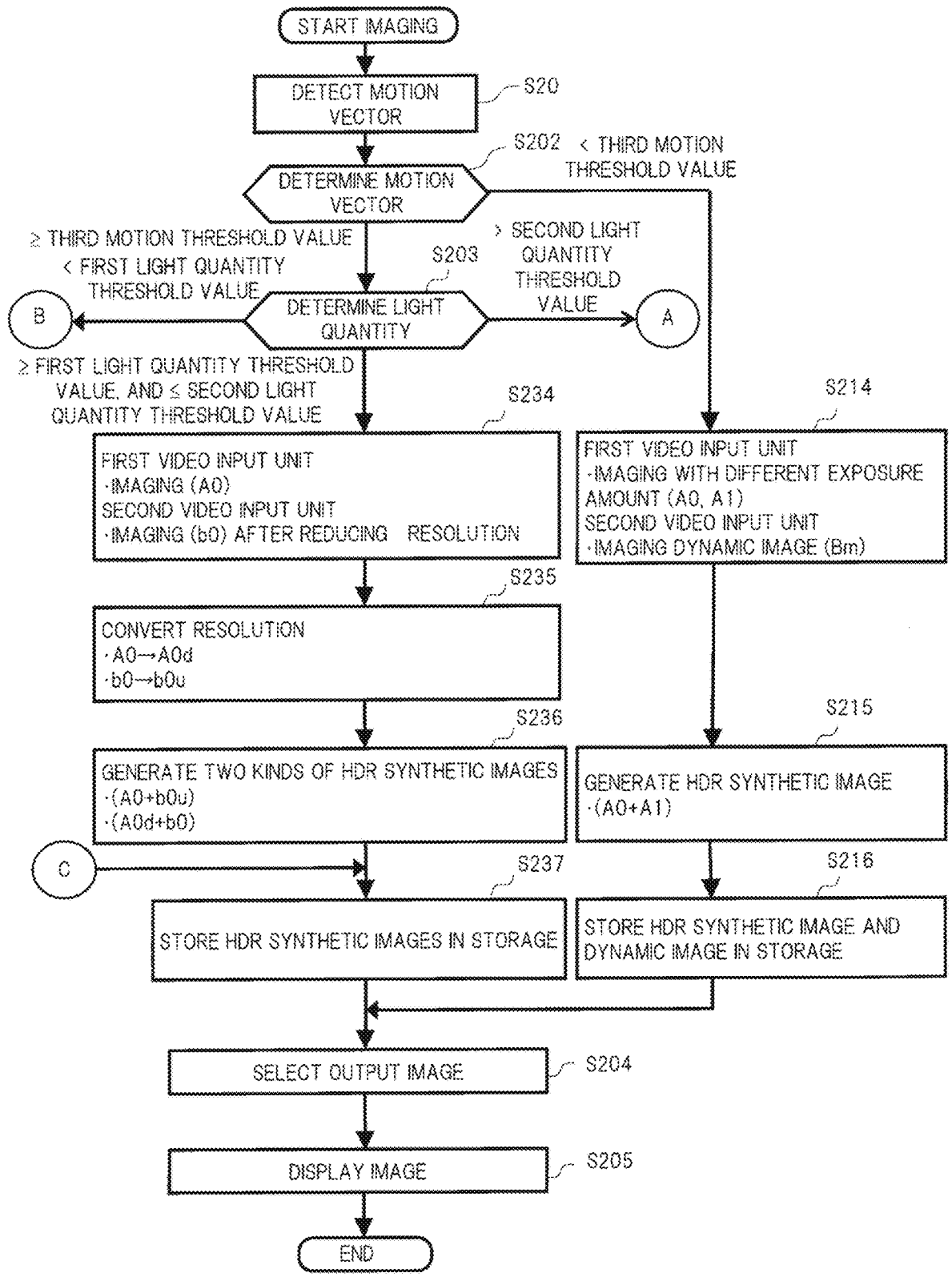
FIG. 14 is a flowchart related to an imaging method according to the second embodiment of the present invention.
Figure 15:
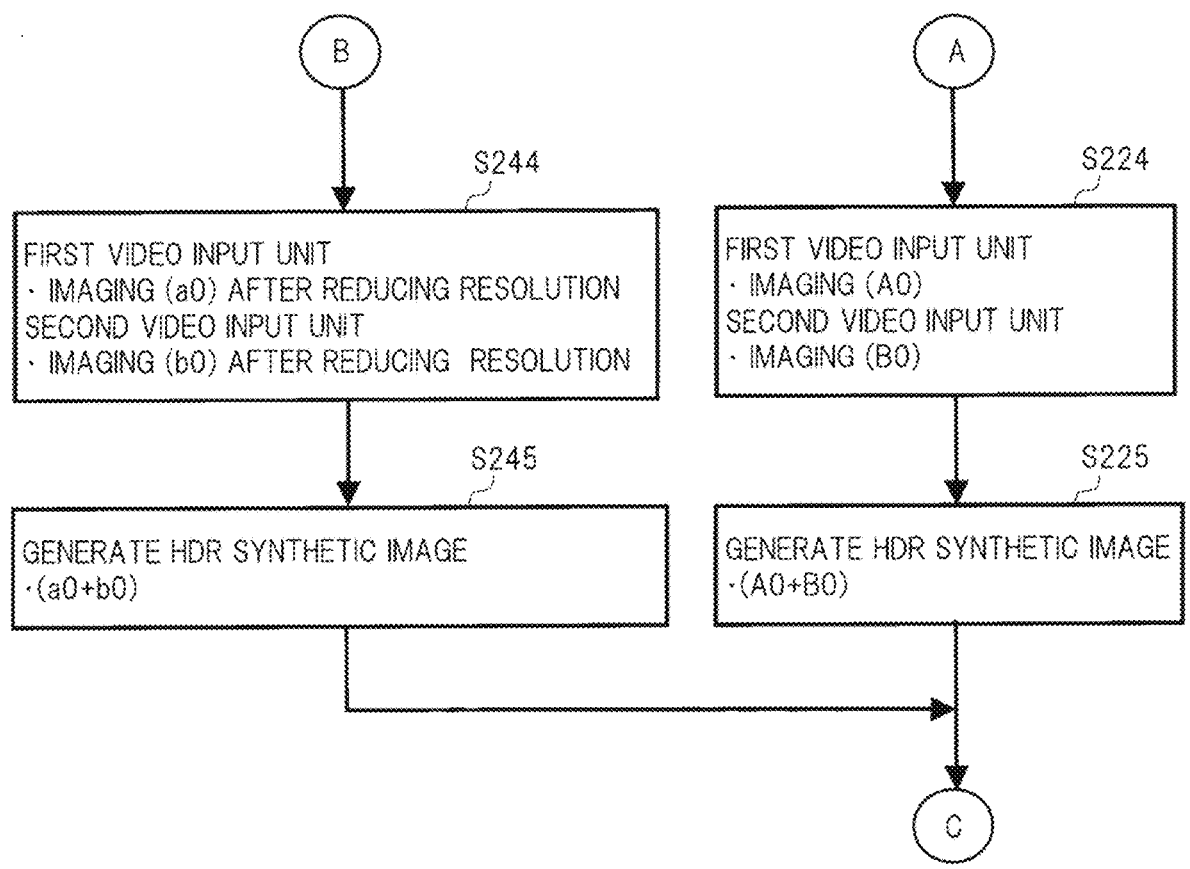
FIG. 15 is a flowchart related to the imaging method according to the second embodiment of the present invention.

Next, an imaging method according to the present embodiment will be described. FIG. 14 and FIG. 15 are flowcharts related to the imaging method according to the second embodiment of the present invention. In the present embodiment, the video inputting step S10, the motion information detecting step S20, the imaging step S30, and the HDR synthetic image generating step S40, which are illustrated in FIG. 5, are executed. The video inputting step S10 and the motion information detecting step S20 are similar to those according to the first embodiment described above.

At the imaging step S30, a process at Step S202 is first executed. At Step S202, motion of the object is determined on the basis of the motion information. Specifically, the main controller 101 compares the motion vector detected at the motion information detecting step S20 with a third motion threshold value, thereby determining the motion of the object. Specifically, the main controller 101 reads out the third motion threshold value stored in the storage 110 to the memory 104, and compares the motion vector with the third motion threshold value. The third motion threshold value is set appropriately y experiments and the like, for example.

[Still Image Imaging Mode]

In a case where the main controller 101 determines that the magnitude of the motion vector is less than the third motion threshold value at Step S202, a process at Step S214 is executed. Namely, the main controller 101 determines that the object hardly moves, and switches into a still image imaging mode.

At Step S214, a process similar to the process at Step S113 according to the first embodiment is executed. Namely, the first video input unit 123 takes an image of the object in succession so as to differentiate an exposure amount thereof. The first video input unit 123 takes an image of the object with an exposure amount $L_{A0}$ on taking an image first time, for example, and takes an image of the object with an exposure amount $L_{A1}$, which is smaller than the exposure amount $L_{A0}$ ($L_{A0}>L_{A1}$), on taking an image second time. For example, the first imaging device 123b generates electric signals (A0, A1) illustrated in FIG. 9 with respect to a taken image with high resolution, and outputs the generated electric signals (A0, A1) to the first image processor 122a. Here, a case where two kinds of image signals whose exposure amounts are different from each other are subjected to a synthesizing process will be described. However, for example, three kinds or more of image signals may be subjected to the synthesizing process.

On the other hand, the second video input unit 224 may take a dynamic image (Bm) of the object, for example, or take an image of the object so as to differentiate a depth of field thereof. Further, since the second imaging device 224b of the second video input unit 224 is also high resolution, for example, the second video input unit 224 may take an image of the object at the same time with the first video input unit 123 so as to differentiate an exposure amount thereof (for example, $L_{A1}$ or the like). The second imaging device 224b generates the electric signal (A0) with the exposure amount $L_{A0}$ and an electric signal (A1) with the exposure amount $L_{A1}$, and outputs the generated electric signals (A0, A1) to the first image processor 122a. The second imaging device 224b outputs the image signals regarding the dynamic image and the like to the second image processor 122b of the video signal processor 122. The processing flow then shifts to the HDR synthetic image generating step S40.

At the HDR synthetic image generating step S40, a process at Step S215 is executed. At Step S215, a process similar to the process at Step S114 according to the first embodiment is executed. Namely, the image synthesizer 122c generates an HDR synthetic image (A0+A1) with the first resolution on the basis of the plurality of image signals (A0, A1) whose exposure amounts are different from each other, which are generated at Step S214. Further, the image synthesizer 122c may generate an HDR synthetic image on the basis of the electric signals generated by the first imaging device 123b and the second imaging device 224b. Further, the image synthesizer 122c generates a thumbnail image corresponding to the HDR synthetic image. The first image processor 122a and the second image processor 122b generate taken images before synthesis, dynamic images, and thumbnail images corresponding to these images.

Note that the first image processor 122a and the second image processor 122b may convert an image signal with high resolution into an image signal with low resolution, and the image synthesizer 122c may generate an HDR synthetic image with low resolution. The processing flow then shifts to Step S216.

At Step S216, a process similar to the process at Step S115 according to the first embodiment is executed. Namely, the HDR synthetic image generated at Step S215, the taken images before synthesis, the dynamic images, the thumbnail images and the like are stored in the storage 110.

[Moving Object Imaging Mode]

Figure 16:
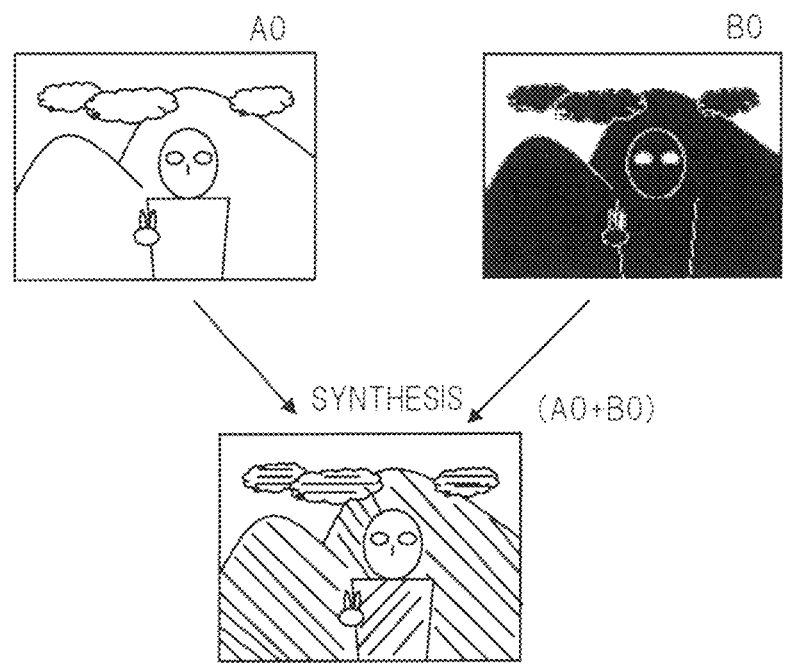
FIG. 16 is a view schematically illustrating an HDR synthesizing process according to the second embodiment of the present invention.

FIG. 16 is a view schematically illustrating an HDR synthesizing process according to the second embodiment of the present invention. In a case where the main controller 101 determines at Step S202 of the imaging step S30 that the motion vector is equal to or more than the third motion threshold value, the main controller 101 determines that motion of the object is large, and switches into a moving object imaging mode. When to switch into the moving object imaging mode, the processing flow shifts to Step S203.

At Step S203, the imaging modes are switched on the basis of the light quantity measured by the light quantity sensor 165. Specifically, the light quantity sensor 165 measures light quantity of the periphery of the imaging apparatus 200, and outputs information regarding the measured light quantity to the main controller 101 as light quantity information. The main controller 101 compares the measured light quantity with a first light quantity threshold value and a second light quantity threshold value on the basis of the inputted light quantity information. The second light quantity threshold value is larger than the first light quantity threshold value. Specifically, the main controller 101 reads out the first light quantity threshold value and the second light quantity threshold value stored in the storage 110 to the memory 104, and compares the light quantity with the first light quantity threshold value and the second light quantity threshold value. The first light quantity threshold value and the second light quantity threshold value are set appropriately by experiments and the like, for example.

<High Light Quantity Moving Object Imaging Mode>

In a case where the main controller 101 determines that the light quantity exceeds the second light quantity threshold value, the processing flow shifts to Step S224. Namely, the main controller 101 determines that the light quantity is high, and switches into a high light quantity moving object imaging mode.

At Step S224, the main controller 101 causes the first video input unit 123 and the second video input unit 224 to take an image of the object at the same time so as to differentiate exposure amounts thereof. At this time, the main controller 101 sets resolution of each of the first imaging device 123b and the second imaging device 224b to the first resolution that is high resolution.

For example, in a case where the resolution of the first imaging device 123b or the second imaging device 224b is set to low resolution, the main controller 101 outputs the resolution conversion information, by which resolution of the corresponding imaging device is to be converted, to the resolution converter 228. The resolution converter 228 converts the resolution of the corresponding imaging device from low resolution to high resolution on the basis of the inputted resolution conversion information.

When the resolution of the imaging device is set in this manner, the first video input unit 123 takes an image of the object with the exposure amount $L_{A0}$, for example, to generate the electric signal (A0) as illustrated in FIG. 16 with respect to the taken image with high resolution. The second video input unit 124 takes an image of the object with an exposure amount $L_{B0}$ that is smaller than the exposure amount $L_{A0}$ ($L_{A0}$>$L_{B0}$), for example, to generate an electric signal (B0) as illustrated in FIG. 16 with respect to the taken image with high resolution.

The first imaging device 123b outputs the electric signal (A0) with the exposure amount $L_{A0}$ to the first image processor 122a. The second imaging device 124b outputs the electric signal (B0) with the exposure amount $L_{B0}$ to the second image processor 122b. The processing flow then shifts to the HDR synthetic image generating step S40.

At the HDR synthetic image generating step S40, a process at Step S225 is executed. At Step S225, the image synthesizer 122c generates an HDR synthetic image (A0+B0) with high resolution illustrated in FIG. 16 on the basis of the plurality of image signals (A0, B0) generated at Step S224, for example. Further, the image synthesizer 122c generates a thumbnail image corresponding to the HDR synthetic image. The first image processor 122a and the second image processor 122b generates the taken images before synthesis, the dynamic images, and the thumbnail images corresponding to these images.

Note that each of the first image processor 122a and the second image processor 122b may converts an image signal with high resolution into an image signal with low resolution, and the image synthesizer 122c may generate an HDR synthetic image with low resolution. The processing flow then shifts to Step S237.

At Step S237, a process similar to the process at Step S126 according to the first embodiment is executed. Namely, the HDR synthetic image generated at Step S225, the taken image before synthesis, the dynamic image, the thumbnail image and the like are stored in the storage 110. The processing flow then shifts to Step S204. The process at Step S204 will be described later.

<Intermediate Light Quantity Moving Object Imaging Mode>

FIG. 17 is a view schematically illustrating an HDR synthesizing process according to the second embodiment of the present invention. In a case where the main controller 101 determines that the light quantity is equal to or more than the first light quantity threshold value and is equal to or less than the second light quantity threshold value, the processing flow shifts to Step S234. Namely, the main controller 101 determines that the light quantity is smaller than that in the high light quantity moving object imaging mode, and switches into an intermediate light quantity moving object imaging mode.

At Step S234, the main controller 101 causes the first video input unit 123 and the second video input unit 224 to take an image of the object at the same time so as to differentiate exposure amounts thereof. At this time, the main controller 101 causes the resolution converter 228 to convert resolution of the first imaging device 123b into the first resolution, and to convert resolution of the second imaging device 224b into the second resolution.

For example, in a case where the resolution of the first imaging device 123b is set to low resolution, the main controller 101 outputs the resolution conversion information, by which the resolution of the first imaging device 123b is to be converted, to the resolution converter 228. The resolution converter 228 converts the resolution of the first imaging device 123b from low resolution to high resolution on the basis of the inputted resolution conversion information. Further, in a case where the resolution of the second imaging device 224b is set to high resolution, the main controller 101 outputs the resolution conversion information, by which the resolution of the second imaging device 224b is to be converted, to the resolution converter 228. The resolution converter 228 converts the resolution of the second imaging device 224b from high resolution to low resolution on the basis of the inputted resolution conversion information.

When the resolution of the imaging device is set in this manner, the first video input unit 123 takes an image of the object with the exposure amount $L_{A0}$, for example, to generate the electric signal (A0) as illustrated in FIGS. 17(A) and 17(B) with respect to the taken image with high resolution. The second video input unit 124 takes an image of the object with an exposure amount $L_{b0}$ that is smaller than the exposure amount $L_{A0}$ ($L_{A0}>L_{b0}$), for example, to generate an electric signal (b0) as illustrated in FIGS. 17(A) and 17(B) with respect to the taken image with low resolution. Since resolution of the second video input unit 224 is smaller than that of the first video input unit 123, it is possible to appropriately set the exposure amount for expanding a dynamic range in the HDR synthetic image.

The first imaging device 123b outputs the electric signal (A0) with the exposure amount $L_{A0}$ to the first image processor 122a. The second imaging device 124b outputs the electric signal (b0) of the exposure amount $L_{b0}$ to the second image processor 122b. The processing flow then shifts to the HDR synthetic image generating step S40.

At the HDR synthetic image generating step S40, a process at Step S235 is first executed. At Step S235, for example, the process similar to the process at Step S124 according to the first embodiment is executed. Namely, resolution of each of the electric signals generated at Step S235 and Step S234 is converted. Specifically, the first image processor 122a executes resolution conversion for the electric signal (A0) with high resolution, for example, to generate an electric signal (A0d) with low resolution illustrated in FIG. 17(B). The second image processor 122b executes resolution conversion for the electric signal (b0) with low resolution, for example, to generate an electric signal (B0u) with high resolution illustrated in FIG. 17(A). The processing flow then shifts to Step S236.

At Step S236, the image synthesizer 122c generates an HDR synthetic image (A0+B0u) with high resolution illustrated in FIG. 17(A), for example, and an HDR synthetic image (A0d+b0) with low resolution illustrated in FIG. 17(B), for example, on the basis of the plurality of electric signals (A0, b0, A0d, B0u) generated at Step S235. Further, the image synthesizer 122c generates a thumbnail image corresponding to the HDR synthetic image. The first image processor 122a and the second image processor 122b generates the taken images before synthesis, the dynamic images, and the thumbnail images corresponding to these images. The processing flow then shifts to Step S237.

At Step S237, the HDR synthetic images generated at Step S236, the taken images before synthesis, the dynamic image, the thumbnail images and the like are stored in the storage 110. The processing flow then shifts to Step S204. The process at Step S204 will be described later.

<Low Light Quantity Moving Object Imaging Mode>

Figure 18:
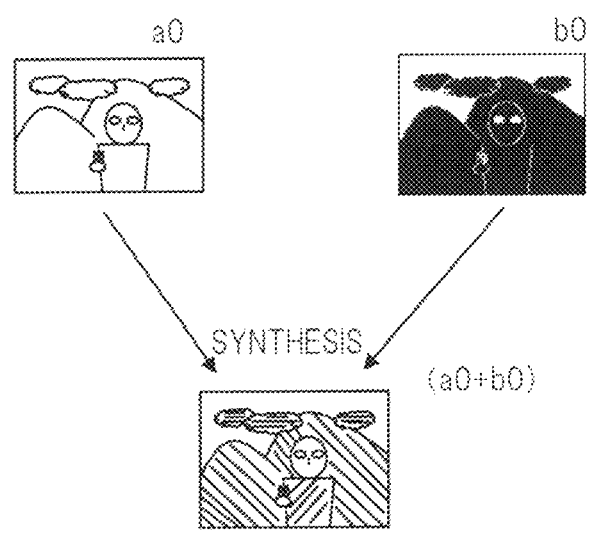
FIG. 18 is a view schematically illustrating the HDR synthesizing process according to the second embodiment of the present invention.

FIG. 18 is a view schematically illustrating an HDR synthesizing process according to the second embodiment of the present invention. In a case where the main controller 101 determines that the light quantity is less than the first light quantity threshold value, the processing flow shifts to Step S244. Namely, the main controller 101 determines that the light quantity is smaller than that in the intermediate light quantity moving object imaging mode, and switches into a low light quantity moving object imaging mode.

At Step S224, the main controller 101 causes the first video input unit 123 and the second video input unit 224 to take an image of the object at the same time so as to differentiate exposure amounts thereof. At this time, the main controller 101 causes the resolution converter 228 to convert resolution of each of the first imaging device 123b and the second imaging device 224b into the second resolution that is low resolution.

For example, in a case where the resolution of the first imaging device 123b or the second imaging device 224b is set to high resolution, the main controller 101 outputs the resolution conversion information, by which the resolution of the corresponding imaging device is to be converted, to the resolution converter 228. The resolution converter 228 converts the resolution of the corresponding imaging device from high resolution to low resolution on the basis of the inputted resolution conversion information.

When the resolution of the imaging device is set in this manner, the first video input unit 123 takes an image of the object with the exposure amount $L_{a0}$, for example, to generate the electric signal (a0) as illustrated in FIG. 18 with respect to the taken image with low resolution. The second video input unit 124 takes an image of the object with an exposure amount $L_{b0}$ that is smaller than the exposure amount $L_{a0}$, for example, to generate an electric signal (b0) as illustrated in FIG. 18 with respect to the taken image with low resolution. Since resolution of each of the first video input unit 123 and the second video input unit 224 is set to low resolution, it is possible to appropriately set the exposure amount for expanding the dynamic range in the HDR synthetic image.

The first imaging device 123b outputs the electric signal (a0) with the exposure amount $L_{a0}$ to the first image processor 122a. The second imaging device 124b outputs the electric signal (b0) of the exposure amount $L_{b0}$ to the second image processor 122b. The processing flow then shifts to the HDR synthetic image generating step S40.

At the HDR synthetic image generating step S40, a process at Step S225 is executed. At Step S225, the image synthesizer 122c generates an HDR synthetic image (a0+b0) with low resolution illustrated in FIG. 18 on the basis of the plurality of image signals (a0, b0) generated at Step S224, for example. Further, the image synthesizer 122c generates a thumbnail image corresponding to the HDR synthetic image. The first image processor 122a and the second image processor 122b generates the taken images before synthesis, the dynamic images, and the thumbnail images corresponding to these images. The processing flow then shifts to Step S237.

At Step S237, the HDR synthetic image generated at Step S225, the taken image before synthesis, the dynamic image, the thumbnail image and the like are stored in the storage 110.

Note that each of the first image processor 122a and the second image processor 122b may convert an image signal with low resolution into an image signal with high resolution, and the image synthesizer 122c may generate an HDR synthetic image with high resolution. The processing flow then shifts to Step S204.

At Step S204, a process similar to the process at Step S104 according to the first embodiment is executed, whereby an image or the like to be displayed on the display 121 is selected. The processing flow then shifts to Step S205.

At Step S205, a process similar to the process at Step S105 according to the first embodiment is executed, whereby the image selected by a user at Step S204 is displayed on the display 121.

According to the present embodiment, the imaging apparatus 100 includes the light quantity sensor 165 configured to measure light quantity, and the main controller 101 causes the video input unit 220 to take an image of the object multiple times so as to differentiate an exposure amount thereof on the basis of the motion vector and the light quantity.

According to this configuration, it is possible to select a more appropriate imaging mode based on motion of the object and light quantity of the periphery. Therefore, it is possible to generate a high-quality HDR synthetic image compatible with imaging environment.

Further, according to the present embodiment, the main controller 101 compares the motion vector with the third motion threshold value. In a case where it is determined that the motion information is less than the third motion threshold value, the main controller 101 switches into the still image imaging mode. The main controller 101 causes the first video input unit 123 to take an image of the object in succession so as to differentiate an exposure amount thereof, and causes the video signal processor 122 to generate the HDR synthetic image with the first resolution.

According to this configuration, since the object hardly moves, it is possible to suppress occurrence of noise due to motion of the object even in a case of taking an image of the object with time intervals. This makes it possible to generate a high-quality HDR synthetic image compatible with imaging environment by using only the first video input unit 123. Further, this makes it possible to use the second video input unit 224 for motion or animation imaging, and the imaging apparatus 200 with excellent handleability is thus provided.

Further, according to the present embodiment, in a case where the main controller 101 determines that the motion vector is equal to or more than the third motion threshold value and the light quantity exceeds the second light quantity threshold value, the main controller 101 switches into the high light quantity moving object imaging mode, causes the first video input unit 123 and the second video input unit 224 to take an image of the object at the same time so as to differentiate exposure amounts thereof, and causes the video signal processor 122 to generate the HDR synthetic image with high resolution.

According to this configuration, it is possible to suppress occurrence of noise due to motion of the object. Therefore, the high-quality HDR synthetic image (A0+B0) with high resolution is generated even though motion of the object is large.

Further, according to the present embodiment, in a case where the main controller 101 determines that the motion vector is equal to or more than the third motion threshold value, the light quantity is equal to or more than the first light quantity threshold value and is equal to or less than the second light quantity threshold value, then the main controller 101 switches into the intermediate light quantity moving object imaging mode. The main controller 101 causes the resolution converter 228 to convert resolution of the second imaging device 224b into the second resolution, and causes the first video input unit 123 and the second video input unit 224 to take an image of the object at the same time so as to differentiate exposure amounts thereof. The main controller 101 then converts resolution of the image signal generated by the first video input unit 123 into the second resolution, converts resolution of the image signal generated by the second video input unit 224 into the first resolution, and causes the video signal processor 122 to generate an HDR synthetic image with the first resolution and an HDR synthetic image with the second resolution.

According to this configuration, by converting the resolution of the second imaging device 224b into low resolution, an area of each of the pixels after resolution conversion is increased. Therefore, it is possible to improve sensitivity of each of the pixels. This makes it possible to shorten an imaging time (exposure time) by the second video input unit 224. Therefore, even in a situation that light quantity is small, it is possible to suppress occurrence of noise due to motion of the object, and it is possible to generate the high-quality HDR synthetic images (A0+B0u, A0d+B0) compatible with imaging environment.

Further, according to this configuration, since a plurality of HDR synthetic images each of which has different resolution is generated, the imaging apparatus 200 with excellent handleability is provided.

Further, according to the present embodiment, in a case where the main controller 101 determines that the motion vector is equal to or more than the third motion threshold value and the light quantity is less than the first light quantity threshold value, the main controller 101 switches into the low light quantity moving object imaging mode. The main controller 101 causes the resolution converter 228 to convert the resolution of each of the first imaging device 123b and the second imaging device 224b into the second resolution, causes the first video input unit 123 and the second video input unit 224 to take an image of the object at the same time so as to differentiate exposure amounts thereof, and causes the video signal processor 122 to generate an HDR synthetic image with the second resolution.

According to this configuration, by converting the resolution of each of the first imaging device 123b and the second imaging device 224b into low resolution, an area of each of the pixels after resolution conversion is increased. Therefore, it is possible to improve sensitivity of each of the pixels. This makes it possible to shorten the imaging time of both the first video input unit 123 and the second video input unit 224. Therefore, even in a situation that light quantity is further small, it is possible to suppress occurrence of noise due to motion of the object, and it is possible to generate the high-quality HDR synthetic images (a0+B0) compatible with imaging environment.

Further, according to the present embodiment, the main controller 101 causes the resolution converter 228 to group a plurality of pixels, thereby converting the resolution of each of the first imaging device 123b and the second imaging device 224b from high resolution to low resolution. Further, the main controller 101 causes the resolution converter 228 to release grouping of the plurality of pixels, thereby converting the resolution of each of the first imaging device 123b and the second imaging device 224b from low resolution to high resolution.

According to this configuration, since there is no need to prepare plural types of imaging devices for plural kinds of resolution, it is possible to miniaturize the imaging apparatus. This makes is possible to suppress manufacturing cost of the imaging apparatus from being increased.

Another Embodiment

In the first and second embodiments that have been explained above, a main controller 101 detects motion information of an object (for example, motion vector) on the basis of an image signal generated by a first imaging device 123b or a second imaging device 124b (or 224b). However, in addition to this, for example, the main controller 101 may detect the motion information of the object on the basis of a focal distance of a video input unit 120. Specifically, in a case where the focal distance of the video input unit 120 is short, an influence of camera shake becomes small. In a case where the focal distance is long, the influence of the camera shake becomes larger. Namely, the main controller 101 detects motion information indicating that the motion of the object is small when the focal distance is short. The main controller 101 detects motion information indicating that the motion of the object is large when the focal distance is long. Thus, the main controller 101 compares the focal distance of the video input unit 120 with a first focal distance threshold value and a second focal distance threshold value. The second focal distance threshold value is larger than the first focal distance threshold value. Then, in a case where the main controller 101 determines that the focal distance of the video input unit 120 is less than the first focal distance threshold value, the main controller 101 switches into a still image imaging mode. Further, in a case where the main controller 101 determines that the focal distance of the video input unit 120 is equal to or more than the first focal distance threshold value and is equal to or less than the second focal distance, the main controller 101 switches into a micromotion imaging mode. Further, in a case where the main controller 101 determines that the focal distance of the video input unit 120 exceeds the second focal distance threshold value, the main controller 101 switches into a moving object imaging mode. Even though the imaging modes are switched on the basis of the focal distance of the video input unit 120 in this manner, the effects described above can be obtained.

Moreover, in the first and second embodiments, the case where an image of the object is taken by two cameras, that is, the first video input unit 123 and the second video input unit 124 (or 224) to generate the HDR synthetic image has been described. However, for example, an image of the object may be taken by using three or more cameras to generate an HDR synthetic image.

As described above, the embodiments of the present invention have been explained, but needless to say, the configuration to realize the technique of the present invention is not limited these embodiments. Further, the numerical values and the like described in the specification or illustrated in the drawings are just one example. Even though different numerical values are utilized, the effects of the present invention are not lost.

A part or all of the functions and the like of the present invention described above may be realized with hardware by designing an integrated circuit, for example. A computer such as a microprocessor unit may interpret programs that realize the respective functions and execute the programs, thereby realizing a part or all of the functions and the like of the present invention described above by software. Alternatively, a part or all of the functions and the like of the present invention described above may be realized by using both hardware and software.

Further, the control lines and the information lines illustrated in the drawings are illustrated as ones that are thought to be necessary for explanation. All of the control lines and the information lines on a product are not necessarily illustrated in the drawings. In fact, it may be thought that almost all components are mutually connected to each other.

REFERENCE SINGS LIST

100 . . . imaging apparatus, 101 . . . main controller, 104a . . . basic operation executing unit, 104b . . . camera function executing unit, 110a . . . basic operation program storage area, 110b . . . camera function program storage area, 120 . . . video input unit, 123 . . . first video input unit, 123b . . . first imaging device, 124 . . . second video input unit, 124b . . . second imaging device, 165 . . . light quantity sensor, 224 . . . second video input unit, 224b . . . second imaging device, 228 . . . resolution converter

The invention claimed is:
1. A smartphone comprising:
a first imaging sensor and a second imaging sensor for generating image signal of incident light from objects;
a light amount detector; a GPS signal receiver; a storage; a wireless communication circuitry; a touch panel display;
an imaging signal processor; and
a controller configured to:
cause the imaging signal processor to acquire the image signal via the first imaging sensor or the second imaging sensor;
based on light amount detected by the light amount detector, control a setting of exposure value of the first imaging sensor and the second imaging sensor;
cause the imaging signal processor to generate a HDR synthetic image of the objects based on a plurality of intermediate image data that the setting of exposure value are different from each other;
generate a thumbnail image from the HDR synthetic image;
store the HDR synthetic image with the thumbnail image in the storage; and
display the HDR synthetic image on the touch panel display corresponding to a touch operation to the thumbnail image displayed on the touch panel display,
wherein the imaging signal processor is further configured to:

operate in either first HDR synthetic mode for generating the HDR synthetic image with first resolution or second HDR synthetic mode for generating the HDR synthetic image with second resolution based on a predetermined threshold value;

generate the plurality of intermediate image data with the first resolution by using the image signal acquired multiple times from the first imaging sensor;

generate the plurality of intermediate image data with the second resolution by using the image signal acquired multiple times from the second imaging sensor;

generate the HDR synthetic image with the first resolution by using the plurality of the intermediate image data with the first resolution in the first HDR synthetic mode; and generate the HDR synthetic image with the second resolution by using the plurality of the intermediate image data with the second resolution in the second HDR synthetic mode, and wherein the controller is further configured to:

obtain location of the smartphone using GPS signal received by the GPS signal receiver;

store the HDR synthetic image with information relating to the location; and transmit the HDR synthetic image stored in the storage to a network via the wireless communication circuitry.

2. The smartphone according to claim 1, wherein
the second resolution is smaller than the first resolution,
the predetermined threshold value used by the imaging signal processor is relating to motion of the objects detected from the image signal, and
wherein
when magnitude of the motion is less than the predetermined threshold value, the imaging signal processor operates in the first HDR synthetic mode, and
when the magnitude of the motion is equal to or more than the predetermined threshold value, the imaging signal processor operates in the second HDR synthetic mode.

3. The smartphone according to claim 1, wherein
the second resolution is smaller than the first resolution,
the predetermined threshold value used by the imaging signal processor is relating to the light amount detected by the light amount detector, and
wherein
when the light amount is higher than the predetermined threshold value, the imaging signal processor operates in the first HDR synthetic mode, and
when the light amount is equal to or lower than the predetermined threshold value, the imaging signal processor operates in the second HDR synthetic mode.

4. The smartphone according to claim 1, wherein
the second resolution is smaller than the first resolution,
the predetermined threshold value used by the imaging signal processor is relating to focal distance detected by the imaging signal processor, and
wherein
when the focal distance is shorter than the predetermined threshold value, the imaging signal processor operates in the first HDR synthetic mode, and
when the focal distance is equal to or longer than the predetermined threshold value, the imaging signal processor operates in the second HDR synthetic mode.

5. The smartphone according to claim 1, wherein resolution of the first imaging sensor and resolution of the second imaging sensor are different from each other.

6. The smartphone according to claim 1, wherein
the light amount detector detects at least the light amount of periphery of the smartphone which is sensed by a light amount sensor, the light amount of the incident light from the objects which is sensed from the image signal by the imaging signal processor, or combination thereof.

7. The smartphone according to claim 1, wherein the imaging signal processor is further configured to:
generate the intermediate image data with third resolution by grouping a plurality of pixels included in the image signal acquired from the first imaging sensor; and
generate the intermediate image data with first resolution by converting resolution of the intermediate image data with third resolution.

8. The smartphone according to claim 1, the smartphone is further comprising a third imaging sensor, wherein
the imaging signal processor is further configured to generate third intermediate image data by using image signal acquired from the third imaging sensor, and
the controller is further configured to store the HDR synthetic image with the third intermediate image data in the storage.

9. An imaging apparatus comprising:
a first imaging sensor and a second imaging sensor for generating image signal of incident light from objects;
an imaging signal processor;
a light amount detector which detects at least the light amount of periphery of the imaging apparatus which is sensed by a light amount sensor or the light amount of the incident light from the objects which is sensed from the image signal by the imaging signal processor; and
a controller configured to:
cause the imaging signal processor to acquire the image signal via the first imaging sensor or the second imaging sensor;
based on light amount detected by the light amount detector, control a setting of exposure value of the first imaging sensor and the second imaging sensor; cause the imaging signal processor to generate a HDR synthetic image of the objects based on a plurality of intermediate image data that the setting of exposure value are different from each other;
wherein the imaging signal processor is further configured to:
operate in first HDR synthetic mode for generating the HDR synthetic image with first resolution;
generate the intermediate image data with the first resolution by using the image signal acquired from the first imaging sensor;
generate the intermediate image data with second resolution by using the image signal acquired from the second imaging sensor and convert to the first resolution; and
generate the HDR synthetic image with the first resolution by using the intermediate image data with the first resolution and the converted intermediate image data with the second resolution.

10. The imaging apparatus according to claim 9, wherein the second resolution is smaller than the first resolution, the imaging signal processor is further configured to:

generate the intermediate image data with second resolution by grouping a plurality of pixels included in the image signal acquired from the second imaging sensor.

11. The imaging apparatus according to claim 9, wherein the imaging signal processor is further configured to:
generate the intermediate image data with the first resolution by using image signal outputted from the first imaging sensor while generating the intermediate image data with the second resolution by using image signal outputted from the second imaging sensor.

12. The imaging apparatus according to claim 9, the imaging apparatus is further comprising a third imaging sensor, wherein
the imaging signal processor is further configured to generate another intermediate image data by using image signal acquired from the third imaging sensor, and
the controller is further configured to store the HDR synthetic image with said another intermediate image data in the storage.

13. The imaging apparatus according to claim 9, wherein the imaging signal processor is further configured to:
operate in second HDR synthetic mode for generating the HDR synthetic image with third resolution; and
operate in either the first HDR synthetic mode or the second HDR synthetic mode based on a predetermined threshold value, and
wherein the third resolution is smaller than the first resolution.

14. The imaging apparatus according to claim 13, wherein the predetermined threshold value used by the imaging signal processor is relating to motion of the objects detected from the image signal, and wherein
when magnitude of the motion is less than the predetermined threshold value, the imaging signal processor operates in the first HDR synthetic mode, and
when the magnitude of the motion is equal to or more than the predetermined threshold value, the imaging signal processor operates in the second HDR synthetic mode.

15. The imaging apparatus according to claim 13, wherein the predetermined threshold value used by the imaging signal processor is relating to the light amount detected by the light amount detector, and wherein
when the light amount is higher than the predetermined threshold value, the imaging signal processor to operate in the first HDR synthetic mode, and
when the light amount is equal to or lower than the predetermined threshold value, the imaging signal processor operates in the second HDR synthetic mode.

16. The imaging apparatus according to claim 13, wherein the predetermined threshold value used by the imaging signal processor is relating to focal distance detected by the imaging signal processor, and wherein
when the focal distance is shorter than the predetermined threshold value, the imaging signal processor operates in the first HDR synthetic mode, and
when the focal distance is equal to or longer than the predetermined threshold value, the imaging signal processor operates in the second HDR synthetic mode.

17. The imaging apparatus according to claim 9, wherein the controller is further configured to:
generate a thumbnail image from the HDR synthetic image;
store the HDR synthetic image with the thumbnail image in a storage; and
display the HDR synthetic image on a touch panel display corresponding to a touch operation to the thumbnail image displayed on the touch panel display.

18. The imaging apparatus according to claim 9, wherein the controller is further configured to:
obtain location of the imaging apparatus using GPS signal received by a GPS signal receiver;
store the HDR synthetic image with information relating to the location in a storage; and
transmit the HDR synthetic image stored in the storage to a network via a wireless communication circuitry.

19. A smartphone comprising:
a first imaging unit and a second imaging unit for generating image signal of incident light from objects;
a light amount detecting unit; a GPS signal receiving unit; a storage unit; a wireless communication circuitry; a touch panel display unit;
an imaging signal processing unit; and
a controller unit for:
causing the imaging signal processing unit to acquire the image signal via the first imaging unit or the second imaging unit;
based on light amount detected by the light amount detecting unit, controlling a setting of exposure value of the first imaging unit and the second imaging unit;
causing the imaging signal processing unit to generate a HDR synthetic image of the objects based on a plurality of intermediate image data that the setting of exposure value are different from each other;
generating a thumbnail image from the HDR synthetic image;
storing the HDR synthetic image with the thumbnail image in the storage unit; and
displaying the HDR synthetic image on the touch panel display unit corresponding to a touch operation to the thumbnail image displayed on the touch panel display unit,
wherein the imaging signal processing unit is further configured to:
operate in either first HDR synthetic mode for generating the HDR synthetic image with first resolution or second HDR synthetic mode for generating the HDR synthetic image with second resolution based on a predetermined threshold value;
generate the plurality of intermediate image data with the first resolution by using the image signal acquired multiple times from the first imaging unit;
generate the plurality of intermediate image data with the second resolution by using the image signal acquired multiple times from the second imaging unit;
generate the HDR synthetic image with the first resolution by using the plurality of the intermediate image data with the first resolution in the first HDR synthetic mode; and
generate the HDR synthetic image with the second resolution by using a plurality of the intermediate image data with the second resolution in the second HDR synthetic mode, and
wherein the controller is further configured to:
obtain location of the smartphone using GPS signal received by the GPS signal receiving unit;

store the HDR synthetic image with information relating to the location; and transmit the HDR synthetic image stored in the storage unit to a network via the wireless communication circuitry.

20. The smartphone according to claim 19, wherein the second resolution is smaller than the first resolution, the predetermined threshold value used by the imaging signal processing unit is relating to focal distance detected by the imaging signal processing unit, and wherein when the focal distance is shorter than the predetermined threshold value, the imaging signal processing unit operates in the first HDR synthetic mode, and when the focal distance is equal to or longer than the predetermined threshold value, the imaging signal processing unit operates in the second HDR synthetic mode.

\* \* \* \* \*